US012800043B2

(12) United States Patent
Jacot et al.

(10) Patent No.: US 12,800,043 B2
(45) Date of Patent: Nov. 17, 2026

(54) COMPACT CHECK VALVE ASSEMBLY FOR SELF-INFLATING MATTRESS

(71) Applicant: JD JACOT CORP, Kingston, WA (US)

(72) Inventors: Douglas S. Jacot, Kingston, WA (US); Peter Brazil, Kingston, WA (US)

(73) Assignee: JD JACOT CORP, Kingston, WA (US)

( * ) Notice: Subject to any disclaimer, the term of this patent is extended or adjusted under 35 U.S.C. 154(b) by 52 days.

(21) Appl. No.: 18/772,753

(22) Filed: Jul. 15, 2024

(65) Prior Publication Data

US 2024/0369146 A1 Nov. 7, 2024

Related U.S. Application Data

(63) Continuation of application No. PCT/US2023/011344, filed on Jan. 23, 2023.

(Continued)

(51) Int. Cl.

*F16K 15/14* (2006.01)
*A47C 27/08* (2006.01)
*F16K 15/18* (2006.01)

(52) U.S. Cl.

CPC .......... *F16K 15/148* (2013.01); *A47C 27/083* (2013.01); *A47C 27/084* (2013.01); *A47C 27/088* (2013.01); *F16K 15/184* (2021.08)

(58) Field of Classification Search

CPC .... F16K 15/026; F16K 15/028; F16K 15/148; F16K 15/20; F16K 15/202; F16K 15/205;

(Continued)

(56) References Cited

U.S. PATENT DOCUMENTS 2,068,134 A 1/1937 Houghton
2,326,441 A 8/1943 Cunningham (Continued)

FOREIGN PATENT DOCUMENTS

CH 428124 1/1967
CN 2554967 A 6/2003

(Continued)

OTHER PUBLICATIONS

Machine English translation of CN-105179761-A (Year: 2026).*

(Continued)

*Primary Examiner* — Hailey K. Do
(74) *Attorney, Agent, or Firm* — R. Reams Goodloe, Jr.

(57) ABSTRACT

An adjustable compact check valve for a pneumatic self-inflating mattress. The compact check valve includes a preload selector which is adjustable to user selected settings, each of which will vary the load on a preload compression spring, to thereby vary the pressure at which the check valve opens. Such adjustment allows a user to vary the firmness of a self-inflating mattress to which the compact check valve is affixed. The compact check valve also has a fully closed position, where air cannot enter or leave the self-inflating mattress, and a fully open position, where air can enter the self-inflating mattress to allow it to fully inflate, or where a user can compress the mattress for storage, by expelling air from the self-inflating mattress. Once air has been expelled from the mattress, the compact check valve may be closed, to prevent inflation of the mattress.

29 Claims, 24 Drawing Sheets

Related U.S. Application Data

(60) Provisional application No. 63/301,968, filed on Jan. 21, 2022.

(58) Field of Classification Search
CPC .... F16K 15/207; F16K 15/182; F16K 15/184; Y10T 137/3646; A47C 27/082; A47C 27/083; A47C 27/084; A47C 27/088
See application file for complete search history.

(56) References Cited

U.S. PATENT DOCUMENTS

| | | | | |
|---|---|---|---|---|
| 2,372,218 | A | 3/1945 | Manson et al. | |
| 2,604,641 | A | 7/1952 | Reed | |
| 2,691,179 | A | 10/1954 | Kann | |
| 3,533,113 | A | 10/1970 | Stamberger | |
| 3,766,579 | A | 10/1973 | Shields | |
| 4,025,974 | A | 5/1977 | Lea et al. | |
| 4,091,482 | A | 5/1978 | Malcolm | |
| 4,149,919 | A | 4/1979 | Lea et al. | |
| 4,261,776 | A | 4/1981 | Lea | |
| 4,723,329 | A | 2/1988 | Vaccaro | |
| 4,766,628 | A | 8/1988 | Walker | |
| 4,803,744 | A | 2/1989 | Peck et al. | |
| 4,977,633 | A | 12/1990 | Chaffee | |
| 5,033,133 | A | 7/1991 | Nissen | |
| 5,152,018 | A | 10/1992 | Lea | |
| 5,282,286 | A | 2/1994 | MacLeish | |
| 5,507,318 | A | 4/1996 | Israelson | |
| 5,552,205 | A | 9/1996 | Lea | |
| 5,598,593 | A | 2/1997 | Wolfe | |
| 5,632,055 | A | 5/1997 | Graff | |
| 5,642,546 | A | 7/1997 | Shoenhair | |
| 5,765,246 | A | 6/1998 | Shoenhair | |
| 5,926,874 | A | 7/1999 | Browder | |
| 5,974,608 | A | 11/1999 | Haller et al. | |
| 6,076,214 | A | 6/2000 | Klimenko | |
| 6,446,289 | B1 | 9/2002 | Su et al. | |
| 6,611,981 | B1 | 9/2003 | Lin | |
| 6,665,893 | B2 | 12/2003 | Fruge | |
| 6,671,910 | B2 | 1/2004 | Hsu et al. | |
| 6,754,925 | B1 | 6/2004 | Wang | |
| 6,836,914 | B1 | 1/2005 | Tsai | |
| 7,107,641 | B2 | 9/2006 | Davis | |
| 7,134,158 | B2 | 11/2006 | Tokarz | |
| 7,147,106 | B2 | 12/2006 | Kowalski et al. | |
| 7,353,555 | B2 | 4/2008 | Lau | |
| 7,412,738 | B2 | 8/2008 | Chaffee | |
| 7,438,081 | B1 * | 10/2008 | Chen | F16K 15/207 137/493.2 |
| 7,631,381 | B2 | 12/2009 | Flippin | |
| 8,584,287 | B2 | 11/2013 | Hrubant et al. | |
| 8,955,182 | B1 | 2/2015 | Schiller et al. | |
| 9,913,548 | B2 | 3/2018 | Jacot et al. | |
| 10,092,242 | B2 | 10/2018 | Nunn et al. | |
| 2002/0138911 | A1 | 10/2002 | Giori et al. | |
| 2002/0148045 | A1 | 10/2002 | Giori et al. | |
| 2003/0200611 | A1 | 10/2003 | Chaffee | |
| 2005/0005363 | A1 | 1/2005 | Giori et al. | |
| 2005/0044634 | A1 | 3/2005 | Wang | |
| 2005/0193494 | A1 | 9/2005 | Lau | |
| 2006/0037145 | A1 | 2/2006 | Wang | |
| 2006/0075569 | A1 | 4/2006 | Giori et al. | |
| 2006/0174416 | A1 | 8/2006 | Wu | |
| 2006/0174417 | A1 | 8/2006 | Elrod et al. | |
| 2009/0130373 | A1 | 5/2009 | Sharir | |
| 2009/0139034 | A1 | 6/2009 | Maarbjerg | |
| 2011/0072589 | A1 | 3/2011 | Dennis et al. | |
| 2011/0154574 | A1 | 6/2011 | Hrubant et al. | |
| 2012/0011656 | A1 | 1/2012 | Daly | |
| 2013/0025070 | A1 | 1/2013 | Ruehlmann | |
| 2014/0209184 | A1 | 7/2014 | Frayne | |
| 2014/0298589 | A1 | 10/2014 | Bailey | |
| 2016/0166079 | A1 * | 6/2016 | Tsai | F16K 15/065 137/232 |
| 2016/0186874 | A1 | 6/2016 | Lin | |
| 2016/0223095 | A1 | 8/2016 | Sando et al. | |
| 2017/0042338 | A1 | 2/2017 | Yang | |
| 2017/0367489 | A1 | 12/2017 | Marson et al. | |
| 2018/0017177 | A1 | 1/2018 | Marson et al. | |

FOREIGN PATENT DOCUMENTS

| | | | | |
|---|---|---|---|---|
| CN | 2593659 | Y | 12/2003 | |
| CN | 1551738 | A | 12/2004 | |
| CN | 105179761 | A * | 12/2015 | F16K 15/20 |
| CN | 108569377 | A | 9/2018 | |
| CN | 109185512 | A * | 1/2019 | F16K 15/205 |
| CN | 211092927 | U | 7/2020 | |
| CN | 111795196 | A | 10/2020 | |
| CN | 111802857 | A | 10/2020 | |
| EP | 0255301 | A1 | 2/1988 | |
| EP | 0849513 | A2 * | 6/1998 | F16K 15/205 |
| EP | 0839480 | B1 | 5/2003 | |
| EP | 1523912 | A1 | 4/2005 | |
| EP | 1082039 | B1 | 1/2006 | |
| EP | 2030533 | A2 | 3/2009 | |
| EP | 3943789 | A1 * | 1/2022 | F01P 11/0238 |
| FR | 2968057 | A1 * | 6/2012 | B63B 7/08 |
| GB | 305911 | | 2/1929 | |
| GB | 2185681 | A | 7/1987 | |
| KR | 1007898361 | B1 | 12/2007 | |
| WO | WO 1986/02244 | A1 | 4/1986 | |
| WO | WO 0065962 | | 11/2000 | |
| WO | WO 2004/006726 | A1 | 1/2004 | |
| WO | WO 2014/130538 | A1 | 8/2014 | |
| WO | WO 2016/018768 | A1 | 2/2016 | |
| WO | WO 2016/141240 | A1 | 9/2016 | |
| WO | WO 2016/141436 | A1 | 9/2016 | |
| WO | WO 2018/064776 | A1 | 4/2018 | |
| WO | WO 2018/156971 | A1 | 8/2018 | |

OTHER PUBLICATIONS

Machine English translation of CN-109185512-A (Year: 2026).*
Machine English translation of FR-2968057-A1 (Year: 2026).*
International Preliminary Report on Patentability / Written Opinion of the International Searching Authority (KIPO). PCT/US2023/011344—Filing Date: Jan. 23, 2023—Applicant: JD Jacot Corp. (5 pages Notification Concerning Transmittal of International Preliminary Report on Patentability (1 page).
PCT International Search Report and Written Opinion (dated Oct. 28, 2015) . PCT/US15/042121, Cascade Designs, Inc. (7 pages).
PCT International Search Report and Written Opinion (dated May 23, 2016) PCT/US16/020775, Cascade Designs, Inc. (8 pages).
PCT International Search Report (ISA-KIPO) (dated Jul. 13, 2020) PCT/US2020/026040 (4 pages).
PCT Written Opinion of the International Searching Authority (ISA-KIPO)—(dated Jul. 13, 2020) PCT/US2020/026040 (10 pages).
https://www.furniture.com/mattress/guide/glossary/foam Meaning of the Term as it Pertains to Mattresses (1pg).
European Patent Office, Supplementary Partial European Search Report, EP20787020, Applicant—JD Jacot Corp—(Apr. 17, 2023) with Communication cover sheet (9 pages).
PCT International Search Report; Written Opinion of the ISA (KIPO) May 17, 2023. PCT/US2023/011344, Applicant—JD Jacot Corp—International Filing Date: Jan. 23, 2023.

* cited by examiner

COMPACT CHECK VALVE ASSEMBLY FOR SELF-INFLATING MATTRESS

RELATED PATENT APPLICATIONS

This application is a continuation of and claims priority from PCT/US2023/011344, filed on Jan. 23, 2023, and published as WIPO Publication No. WO 2023/141329 A1 on Jul. 27, 2023, entitled Compact Check Valve Assembly For Self-Inflating Mattress. That PCT application claimed priority under 35 USC. § 119 (e) from U.S. Provisional Patent Application Ser. No. 63/301,968 filed on Jan. 21, 2022 entitled Compact Check Valve Assembly For Self-Inflating Mattress. The disclosures of each of PCT/US2023/011344 and U.S. Provisional Application Ser. No. 63/301,968, are incorporated herein in their entirety including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

TECHNICAL FIELD

This disclosure relates to self-inflating beds, and more specifically, to check valves for self-inflating beds.

BACKGROUND

A continuing interest and need exists for improvements in self-inflating beds. More particularly, a need exists for bed designs that would provide a significant improvement by minimizing required storage space when not in use. The home bedding retail market has been undergoing significant change, with the recent adoption of the "bed-in-box" model for distribution of beds to today's internet savvy consumers. Although the "bed-in-box" is a relatively new distribution model, there are still many shortcomings in current self-inflating bed offerings found in on-line distribution channels. In one aspect important to consumers, it is unwieldy, and time consuming, for consumers to make "firmness" (i.e. comfort) adjustments in many currently available self-inflating bed designs.

Thus, it would be desirable if a self-inflating bed was available that included valves that would make it easy to adjust the degree of firmness in self-inflating mattress. Such improved valve features, which would facilitate simple adjustments to firmness of a mattress by a user, would be advantageous.

Consequently, a technical problem remains, namely the need to provide an improved design for valves for a stowable self-inflating bed, in order to provide a compact valve which is safely and easily included with the bed. Moreover, it would be advantageous if such a design simultaneously resolves various practical problems, including (a) minimizing any additional shipment and storage volume for including such a valve, and (b) providing adjustable features which make comfort control, i.e. firmness of the mattress, much easier than is the case in the current simple open/close valve designs.

Additionally, while there have been attempts by others to provide an easily stowable bed, most versions of which I am aware have fallen flat when it came to consumer acceptance. At best, currently available stowable beds are primarily useful only as a temporary or as an emergency bed solution. Existing designs known to me perform poorly when it comes to comfort, warmth, stability, adjustability and durability. Consequently, there remains a need for improved control valves which would enable provision of a self-inflating bed that provides easy to use controls that facilitate significantly increased firmness adjustability, and thus improved comfort to the user.

SOME OBJECTS, ADVANTAGES, AND NOVEL FEATURES

Accordingly, one objective of my invention is to provide a compact check valve design for a self-inflating bed which is simple, straightforward, and which is sized and shaped to easily be included in or on such beds, when in a compressed, deflated condition, so that the bed can be sized, shaped, and weight limited in a manner suitable for shipment via United Parcel Service ("UPS"), or similar package shipment and delivery providers.

Another objective of my invention is to provide a design for a compact check valve assembly for a self-inflating bed which includes a manually adjustable check valve which may be easily adjusted to provide a desired level of comfort, e.g. firm, medium, or soft, regardless of the type of bed on which such check valve is installed, e.g., whether installed in a single size bed or in a larger bed such as a queen size configuration.

A related and important objective is to provide a compact check valve design which may be used in a single or multiple configuration, so that when a bed has multiple inflatable portions, a desired comfortable level can be easily and independently controlled for each separably inflatable portion of the bed.

SUMMARY

A compact check valve design is provided for use with a stowable, self-inflating bed. A typical self-inflating bed in which such a compact check valve design may be used includes one or more air impervious enclosures which form plenums filled with and bonded to a breathable resilient foam-like material. The core assembly of the bed is covered by a traditional bed ticking which provides the consumer with the expected look and feel of a traditional bed. The air impervious plenum(s) are usually controlled by at least two different types of purposeful functioning air control valves. The air control valves may include (a) a vacuum port valve, and (b) a comfort adjustment valve, referred to herein as a compact check valve. The vacuum port valve is configured to mate with a traditional household vacuum or shop vacuum (with simple adapters, if necessary) that allow the consumer to deflate the bed. In this manner, a deflated bed is reduced down to a flattened, squeezed together structure which is a fraction of its normal operational thickness and volume, for shipment and storage. In an embodiment, these functions may be provided in a single valve design, as provided in at least one of the embodiments described herein.

In an embodiment, a compact check valve assembly is provided for controlling fluid flow into and out of a pneumatic self-inflating mattress. Such a mattress is normally configured for operation in an air in ambient atmospheric conditions. The compact check valve assembly may include (a) a valve body, (b) a preload guide insert configured for interlocking engagement with the valve body, and (c) a preload knob having a centrally located shaft extending downward, with exterior threads on the shaft which are sized and shaped for threaded engagement with interior threads in a downwardly extending cylindrical portion of the preload guide insert. Further components may include a plunger, a compression spring, and an umbrella valve. An anti-backout O-ring may be provided near the lower end of the shaft extending downward from the pre-load knob. Additionally, gaskets are provided as further described below, and are used for seals at required locations.

A compact check valve may include at least two fluid connections. A first fluid connection may be provided between the manually adjustable compact check valve and the external atmosphere. A second fluid connection may be provided between the manually adjustable compact check valve and an air impervious plenum in the pneumatic self-inflating mattress. In operation of the compact check valve, the first fluid connection may be intermittently opened. Similarly, the second fluid connection may be intermittently opened. The compact check valve may be provided with a manually adjustable controller in the form of a preload selector knob. The preload selector knob may be adjustably selectable between two or more set-points, wherein at a selected set-point, the check valve is operable to provide pressure relief from the pneumatic self-inflating mattress, where the set-point corresponds to a selected internal pressure of an air impervious plenum in the self-inflating mattress. In an embodiment, the manual adjustment mechanism may be moveable between at least three positions. In an embodiment, the preload selector knob may include two or more position indicators using words or acronyms such as SOFT, MEDIUM (or MED), and FIRM (or HARD). In an embodiment, a directional arrows and words CLOSED and OPEN, indicating the CLOSED direction for movement and the OPEN direction for movement of the preload knob. Thus, the manually adjustable compact check valve provides the consumer with the benefit of being able to adjust the firmness of the bed to achieve a desired comfort level.

BRIEF DESCRIPTION OF THE DRAWING

The present invention(s) will be described by way of exemplary embodiments, using for illustration the accompanying drawing in which like reference numerals denote like elements, and in which:

FIG. 1 shows a compact check valve in a closed condition, where air cannot move into or out of a self-inflating mattress in which the valve is installed. FIG. 1A shows a compact check valve in an open condition, wherein air can move into a self-inflating mattress (i.e. while it is inflating) or out from a self-inflating mattress (i.e. when a user is compacting the self-inflating mattress for storage), so air is being expelled from the air impervious envelope to which the valve is attached. FIG. 1B shows a compact check valve in an operating condition, where a user adjusts the knob, thus adjusting the force exerted by the preload compression spring on the plunger, and thus when pressure inside the self-inflating valve exceeds the force exerted by the preload compression spring, air escapes to the atmosphere, and reduces the firmness of the self-inflating mattress.

FIG. 1 is a conceptual view (for illustration, not all components shown to scale) provided as a vertical cross-section of an embodiment for a compact check valve assembly, when in a closed condition, which does not allow air to flow into or out of a self-inflating matter, and illustrates (a) a valve body, shown with an outwardly annulus shaped flange on which operating indicia may be provided (and which may also provide, in whole or in part, a cover for a hole sewn into a mattress cover), (b) a preload guide insert configured for interlocking engagement with the valve body, (c) a preload knob having a centrally located shaft extending downward, with exterior threads on the shaft which are sized and shaped for threaded engagement with interior threads in a downwardly extending cylindrical portion of the preload guide insert, (d) an anti-backout O-ring located in a generally annular position transversely oriented with respect to the downwardly extending shaft on the preload knob, (e) a plunger with air passageway slots therein, (f) a compression spring, (g) an umbrella valve, and (h) a plurality of gaskets for seals at required locations.

FIG. 1A is a conceptual cross-sectional view similar to FIG. 1, showing the compact check valve when in an open condition, in which air may flow freely into or out of a self-inflating mattress in which the check valve is installed, so as to equalize pressure with existing atmospheric conditions, and also illustrates (a) a valve body, shown with an outwardly annulus shaped flange on which operating indicia may be provided (and which may also provide, in whole or in part, a cover for a hole sewn into a mattress cover), (b) a preload guide insert configured for interlocking engagement with the valve body, (c) a preload knob having a centrally located shaft extending downward, with exterior threads on the shaft which are sized and shaped for threaded engagement with interior threads in a downwardly extending cylindrical portion of the preload guide insert, (d) an anti-backout O-ring located in a generally annular position transversely oriented with respect to the downwardly extending shaft on the preload knob, (e) a plunger with air passageway slots therein, (f) a compression spring, (g) an umbrella valve, and (h) a plurality of gaskets for seals at required locations.

FIG. 1B is a conceptual cross-sectional of the compact check valve just illustrated in FIGS. 1 and 1A above, now showing the compact check valve in an intermediate, operating condition, where the preload knob has been adjusted to a desired position where the preload spring force is between an open (no motive force against the plunger) and a closed condition (full motive force against the plunger), so that the user can set a desired degree of firmness in the self-adjusting bed, so that when the pressure in the self-inflating bed exerts force on the plunger exceeding the forced applied by the preload compression spring, the check valve allows air to escape from the self-inflating bed.

FIG. 15 is a top perspective view of an embodiment for a plunger, where the plunger is provided in the generally cupped shape which may include annular cross-sectional portions having a central aperture that is defined by vertical internal cylindrical walls, where the central aperture has a lower end sized and shaped for complementary fitted engagement with an umbrella valve with complementary size and shape, where the umbrella valve central stem is provided in an elastomeric material suitable for secure engagement with a spring housed within the plunger.

FIG. 16 is a bottom perspective view of an embodiment for a plunger, where the plunger is provided in the generally cupped shape which may include annular cross-sectional portions having a central aperture that is defined by vertical internal cylindrical walls, where the exterior walls of the plunger further include a seat for a seal, which may be provided as an O-ring seat, for securing therein an O-ring to seal the plunger against the adjacent valve body walls as the plunger moves vertically during operation, and showing air passageways through the bottom (which communicate with the interior of the cup portion), and where the lower end of the central aperture includes a retainer sized and shaped for complementary fitted engagement with a stem of an umbrella valve located immediately therebelow, and showing the peripheral seal on the bottom, which seals against a sealing flange of an umbrella valve FIG. 17 is a side elevation view of an embodiment for a plunger as illustrated in FIGS. 15 and 16, where the plunger is provided in the generally cupped shape which may include annular cross-sectional portions having a central aperture that is defined by vertical internal cylindrical walls, where the lower end of the cupped shape includes outer sidewalls sized and shaped to include an O-ring seal, for securing therein an O-ring to seal the plunger against the adjacent valve body walls as the plunger moves vertically up and down during operation.

FIG. 15A is a top perspective view of a plunger which has the general shape of a circular flat plate having a central hub with a central aperture therethrough, with the central aperture defined by short vertical internal cylindrical walls, where the central aperture is sized and shaped for complementary fitted engagement with a central stem of an umbrella valve with complementary size and shape, where the umbrella valve central stem is provided in an elastomeric material suitable for secure engagement therewith, and also illustrating a plurality of plunger passageways which are provided for passage of air therethrough.

FIG. 16A is also a top perspective view of a plunger which has the general shape of a circular flat plate having a central hub with a central aperture therethrough, with the central aperture defined by short vertical internal cylindrical walls, where the central aperture is sized and shaped for complementary fitted engagement with a central stem of an umbrella valve (see FIGS. 19A and 19B).

FIG. 17A is a side elevation view of a plunger which has the general shape of a circular flat plate with a central aperture therethrough, where the central aperture is sized and shaped for complementary fitted engagement with a central stem of an umbrella valve.

FIG. 18 is a vertically exploded perspective view of key parts of a compact check valve, showing, from the bottom, a valve body with external threads on a downwardly extending cylindrical portion, a plunger, a valve preload guide portion, and a preload selector knob.

FIG. 19A is a vertically exploded side elevation view of the components of a compact check valve as just illustrated in FIG. 18, showing components from the top, namely the preload selector knob, an anti-backout O-ring, a knob gasket for sealing the gap below the preload selector knob, a preload compression spring, a preload guide, a plunger, an umbrella valve, a plunger gasket for sealing the gap between the underside of the plunger and the interior wall at the lower end of the vertically extending cylinder of the valve body, the valve body with a vertically extending cylindrical portion having external threads for attachment of the compact check valve to a self-inflating mattress having a receiving coupling therein with threads that are complementary in size and shape.

FIG. 19B is a vertically exploded perspective view of the components of a compact check valve as just illustrated in FIG. 19A, showing, from the top, the preload selector knob, an anti-backout O-ring, a knob gasket for sealing the gap below the preload selector knob, a preload compression spring, a preload guide, a plunger, an umbrella valve, a plunger gasket for sealing the gap between the underside of the plunger and the interior wall at the lower end of the vertically extending cylinder of the valve body, the valve body with a vertically extending cylindrical portion having external threads for attachment of the compact check valve to a self-inflating mattress having a receiving coupling therein with threads that are complementary in size and shape.

FIG. 22 is a top perspective view of the components of an embodiment of a fully assembled compact check valve, in an embodiment in which the preload selector valve uses inward sloping perimeter walls, with a knurled preload selector knob design for ease of grip by a user.

FIG. 23 is a side elevation view of the components of an embodiment for a fully assembled compact check valve as just illustrated in FIG. 22 above, again illustrating the compact nature of the check valve when internal components (similar in shape and function as those shown above in FIG. 19A) are nested internally in a working position.

FIG. 24 is a bottom perspective view of the components of a fully assembled compact check valve, in an embodiment in which the preload selector valve uses inward sloping perimeter walls, with a knurled knob design for ease of grip by a user; also shown is the threaded downwardly extending hollow cylinder portion of the valve body, ready for attachment to a self-inflating mattress.

FIG. 28 is a side elevation view of an embodiment for an umbrella valve design which may be useful in a compact check valve, showing a centrally located upwardly extending stem used to hold the umbrella valve in place, and a preloaded convex shape that is useful to create a sealing force against a valve seat that is provided by the lower side, or at the lower peripheral end of a plunger, in the various embodiments depicted herein.

FIG. 29 is a top perspective view of an embodiment for an umbrella valve design which may be useful in various embodiments for a compact check valve, showing a centrally located upwardly extending stem used to hold the umbrella valve in place, and a preloaded convex shape that is useful to create a sealing force against a valve seat, as provided by the lower side, or by the lower peripheral end of a plunger, as well showing an embodiment having a flat sealing flange around the perimeter of the umbrella valve.

Figure 1:
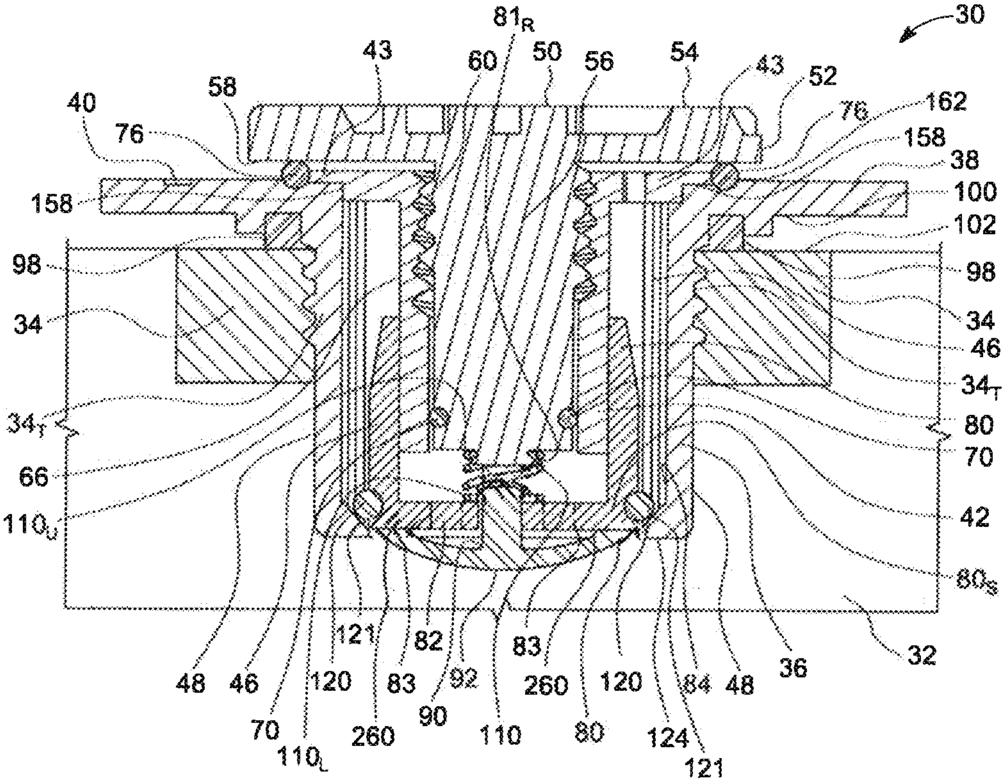
FIGS. 1, 1A, and 1B are provided to illustrate the configuration of a compact check valve in three different operating conditions.

The foregoing figures, being merely exemplary, contain various elements that may be present or omitted from a final configuration for a compact check valve. Other variations in the construction of a compact check valve may use different materials of construction, mechanical structures, mechanical arrangements, air flow configurations, or adjustment mechanism configurations, or firmness valve configurations, or specific or relative dimensions other than those illustrated, and yet employ the principles described herein and as generally depicted in the drawing figures provided. An attempt has been made to draw the figures in a way that illustrates at least those elements that are significant for an understanding of exemplary compact check valves for use in self-inflating bed designs. Such details may be quite useful for providing a novel compact check valve assembly for use in various self-inflating bed designs.

Thus, it should be understood that various features illustrated may be utilized in accord with the teachings hereof, as may be useful in different check valve embodiments for use with a self-inflating bed as useful for various sizes and shapes, depending upon specific design requirements, within the scope and coverage of the teachings herein, as defined by the claims.

DETAILED DESCRIPTION

Attention is directed to FIG. 1, where a vertical cross-sectional view is provided to illustrate an embodiment for a compact check valve assembly 30. The check valve assembly 30 is designed and constructed for controlling fluid flow into and out of a pneumatic self-inflating mattress 32. Here a threaded flange 34 with threads 34T is provided as a part of the self-inflating mattress 32. The threaded flange 34 is used for attachment of the compact check valve 30 to the self-inflating mattress 32. With respect to particulars for a description of various designs for a self-inflating mattress 32, see US Patent Application Publication No. US 2020/0323355 A1, Published Oct. 15, 2020, entitled STOWABLE BED, the disclosure of which is incorporated herein by this reference, including the specification, drawing figures, and claims.

As noted in FIG. 1, in an embodiment, a check valve assembly 30 may include a valve body 36, here shown with an outwardly annular shaped flange 38 on which operating indicia 40 (e.g. OPEN, CLOSED-see FIGS. 4 and 5) may be provided. The operating indicia are instructive to a user in determining how to position the preload knob 50 so as to achieve a desired degree of firmness in the self-inflating mattress in which the check valve is installed. A preload guide insert 66, configured with gear 43 having teeth 158 is provided for interlocking engagement with slots 46 in the interior of the vertically extending slotted cylindrical portion 48 of the valve body 36.

Figure 2:
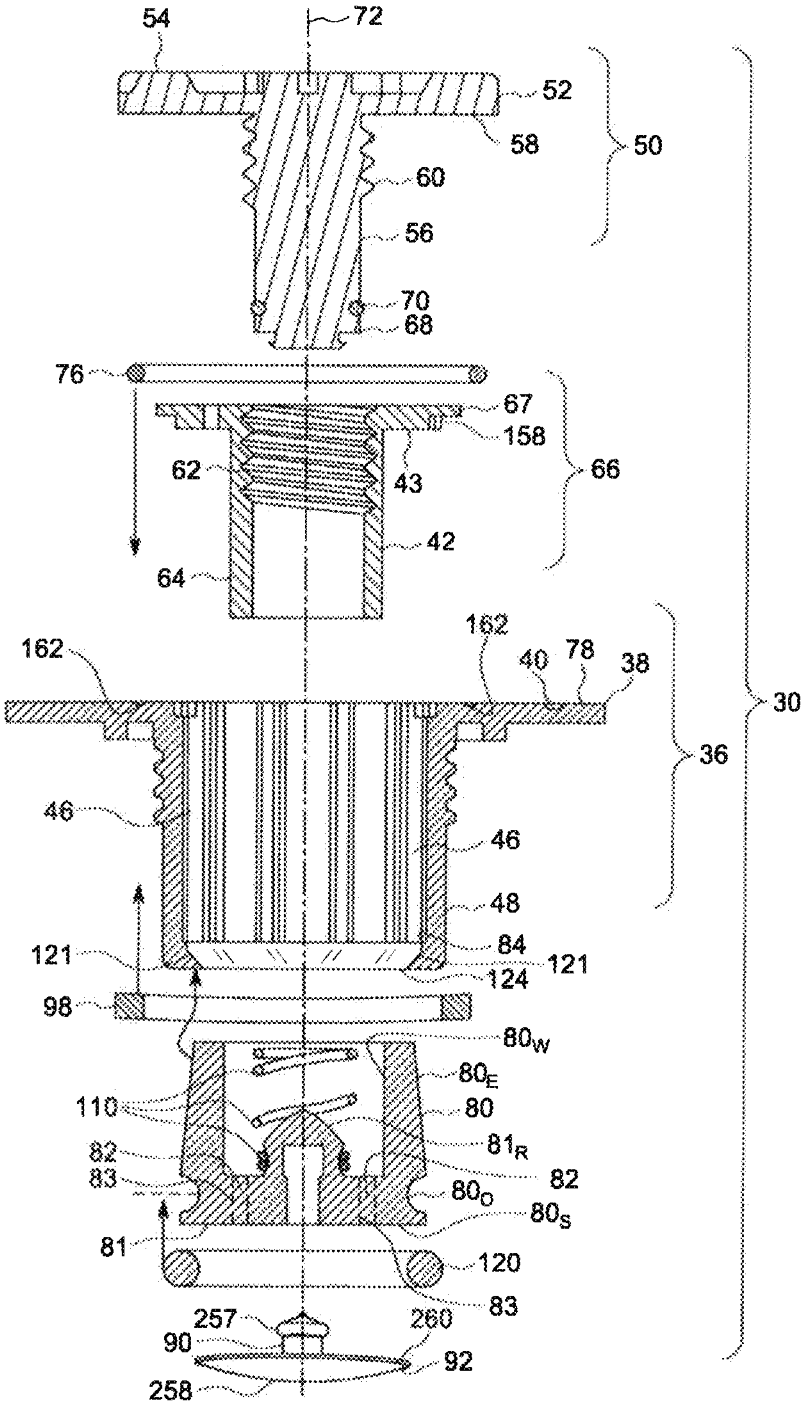
FIG. 2 is an exploded vertical cross-section view of an embodiment for a compact check valve assembly, as just illustrated in FIG. 1 above, including (a) a valve body, shown with an outwardly annulus shaped flange on which operating indicia may be provided, (b) a preload guide insert configured for interlocking engagement with the valve body, (c) a preload knob having a centrally located shaft extending downward, with exterior threads on the shaft which are sized and shaped for threaded engagement with interior threads in a downwardly extending cylindrical portion of the preload guide insert, (d) a preload knob anti-backout O-ring located in a generally annular position transversely oriented with respect to the downwardly extending shaft on the preload knob, (e) a plunger, which in this embodiment may be cup shaped, with air passageway slots therein, (f) a compression spring, (g) an umbrella valve, and (h) a plurality of gaskets for seals at required locations.
Figure 9:
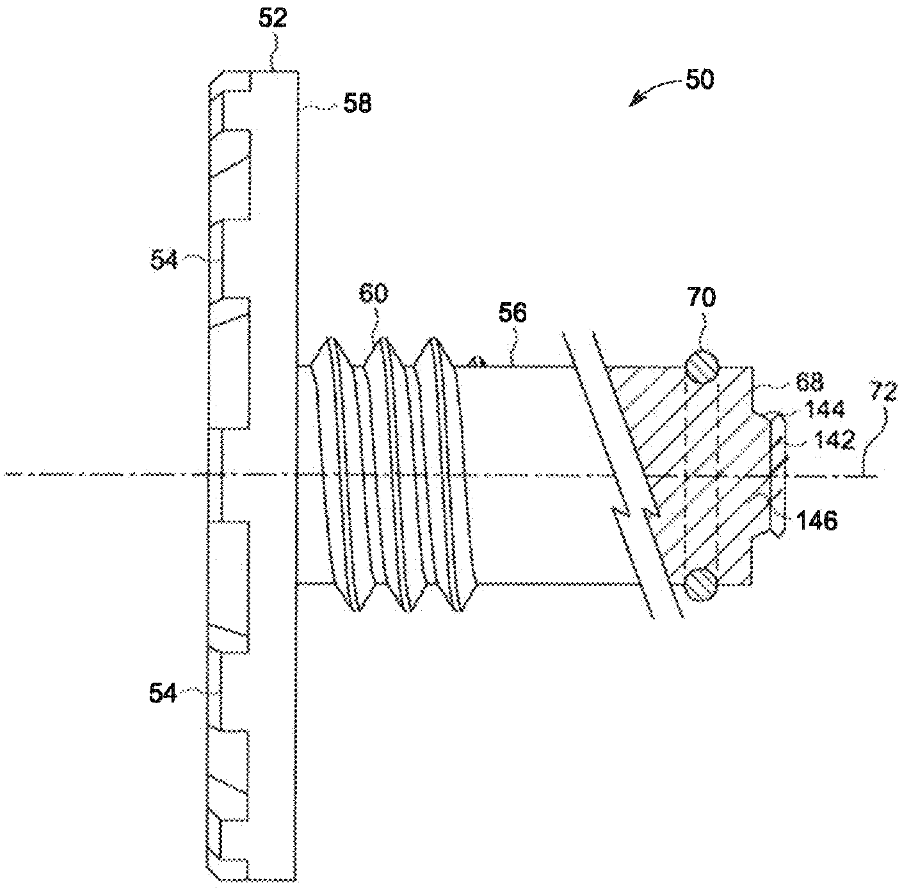
FIG. 9 is a side elevation view of an embodiment for a preload knob for a compact check valve, as just shown in FIG. 8 above, showing the gripping knurls around the perimeter of the preload knob which are provided for use by the user in manipulating the preload knob, and also showing in a cross-sectional view portion at the bottom, a location for the seat for an anti-backout seal, which may be provided as an O-ring as shown, and showing the O-ring in an operating position, oriented transversely with respect to the center-line of the downwardly extending shaft of the preload knob.

As seen in FIGS. 1 and 2, a preload selector knob 50 is provided having a knob portion 52, which may include knurls 54. The preload knob 50 also includes a centrally located shaft 56 extending downward from the lower side 58 of the knob portion. Exterior threads 60 on the shaft 56 are sized and shaped for threaded engagement with interior threads 62 in the downwardly extending cylindrical portion 42 of a preload guide insert 66. Near the lower end 68 of the shaft 56, an anti-backout O-ring 70 may be provided, located in a generally annular tubular configuration transversely oriented with respect to longitudinal axis 72 (see FIG. 9) of the downwardly extending shaft 56. A knob gasket 76, which may be provided in an O-ring form, may be provided to provide a seal between the underside 58 of knob 50 and the upper side 78 of a valve body, such as body 36 in FIG. 1 or 2, or in another embodiment, such as the externally threaded body 79 in FIG. 19A. In an embodiment, the flange 43 of preload guide insert 66 may have a concave outer end 67, shaped for interfitting engagement with the O-ring 76. As noted elsewhere, a gasket seat 162 may be provided in the flange portion 38 of valve body 36 to locate the O-ring 76.

A generally cup shaped plunger 80 with air passageway slots 82 defined by lower passageway walls 83 therein is provided for vertical movement along in the lower interior portion 84 of the vertically extending slotted cylindrical portion 48 of the valve body 36. A plunger 80 may be provided in the generally cup shape as seen in FIGS. 2 and 15, 16, and 17. The plunger 80 may be provided in a generally cupped shape which may include annular cross-sectional portions having a central aperture that is defined by vertical internal cylindrical walls 80*w* (see FIG. 15). The exterior walls 80E of the plunger 80 further include a seat 800 for a seal (see FIG. 17), which may be provided as an O-ring seal 120 (see FIG. 2), for securing therein O-ring 120 to seal the plunger 80 against the adjacent walls, which in an embodiment may be downwardly and inwardly beveled or sloped sealing walls 121, as the plunger 80 moves vertically during operation. As noted above, air passageways 82 defined by passageway walls 83 through the bottom 80B of plunger 80 are provided, and which communicate with an interior portion (see FIG. 2) of the cup shaped plunger 80. A lower end 81 of the plunger 80 may include a central aperture having a retainer 81R sized and shaped for complementary fitted engagement with a stem 90 of an umbrella valve 92 located immediately therebelow. A peripheral seal 80*s* surface is provided on the lower end 81 of plunger 80 which seals against a sealing flange 260 of the umbrella valve.

Figure 15:
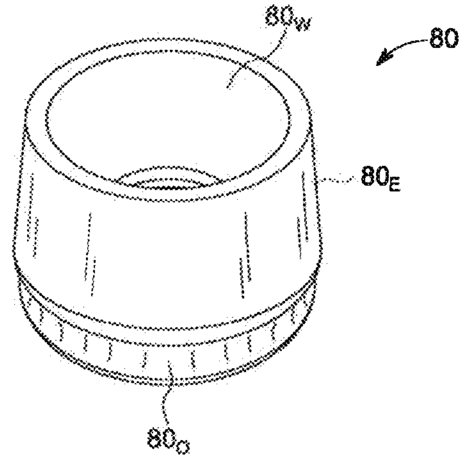
FIGS. 15, 16, and 17 are views for an embodiment for a plunger, as used in an embodiment of a compact check valve, generally as illustrated in FIGS. 1 and 2 above, where the plunger is provided in a generally cup shape, with air passageways through the bottom, and including a retainer at the bottom center for securing the stem of an umbrella valve located immediately below, and showing the peripheral seal on the bottom, which seals against a sealing flange of an umbrella valve (see FIG. 29). In operation, due to the flexible structure of the umbrella valve (normally concave, but operable to displace downward the sealing flange) the peripheral seal and the sealing flange seal and unseal the joint between the underside of the plunger and the umbrella valve.
Figure 16:
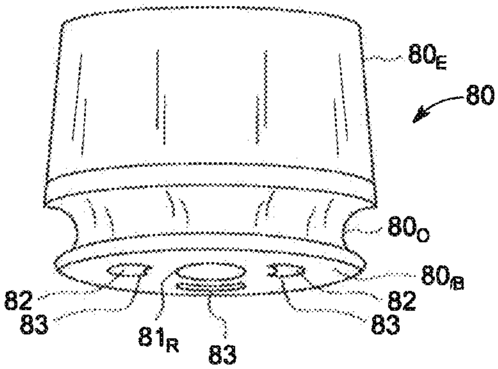
Figure 17:
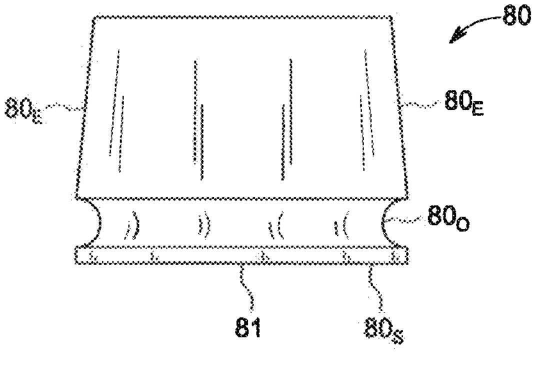
Figure 15A:
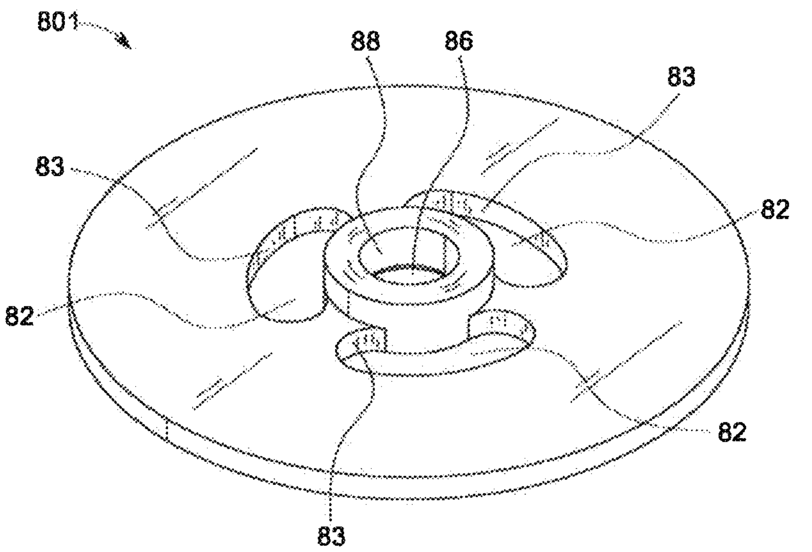
FIGS. 15A, 16A, and 17A are views for another embodiment for a plunger, as used in an embodiment of a compact check valve as illustrated, for example, in FIGS. 18, 19A, and 19B below.
Figure 16A:
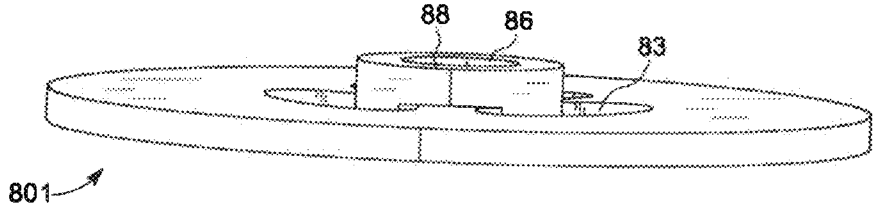
Figure 17A:
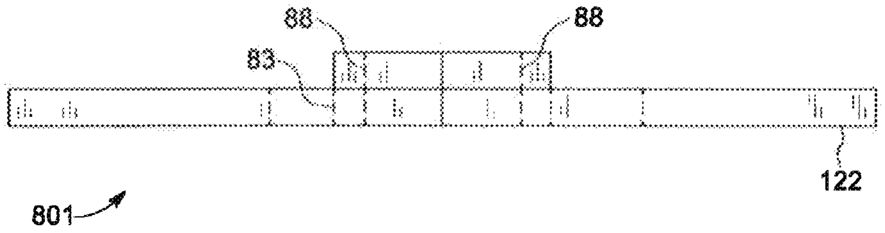

In other embodiments, a plunger 801 may be provided in a circular flat plate shape as seen in FIGS. 15A, 16A, and 17A. In such case, a central aperture 86 is provided therethrough which is defined by short vertical internal cylindrical walls 88, for retention of an umbrella valve 92. Also see those details in FIGS. 15A, 16A, and 17A. The central aperture 86 is sized and shaped for complementary fitted engagement, at the lower end thereof, with an umbrella valve 92, as may be better seen in FIG. 19A.

Figure 19A:
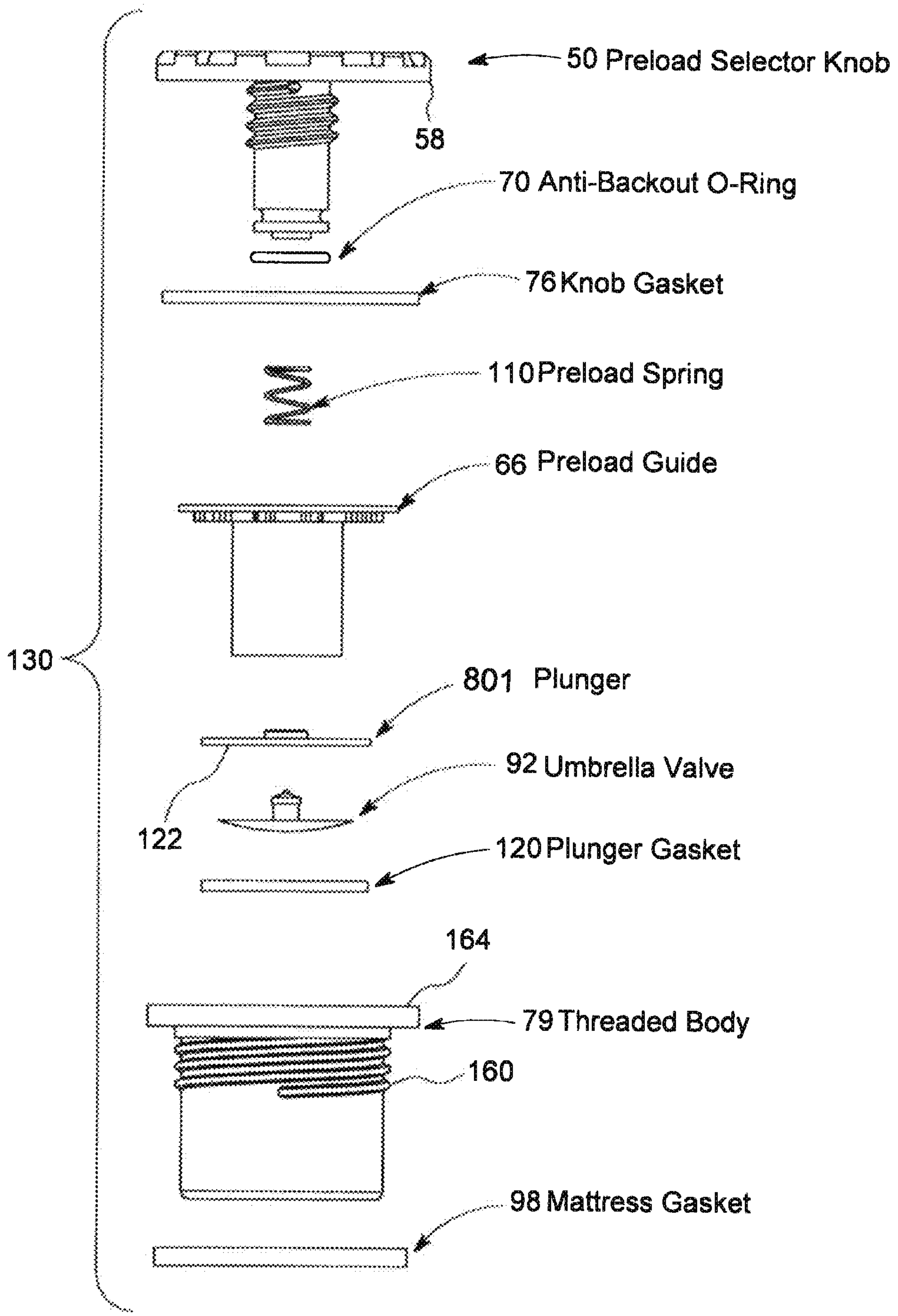

As seen in FIG. 1, and noted in FIG. 19A, a mattress gasket 98 may be used to seal the gap between the underside 100 of valve body (36, or 79) and the top 102 of the threaded flange 34 which is provided with (and in) an air impervious plenum in a self-inflating mattress 32. The threads of threaded flange 34 are sized and shaped for complementary threaded engagement with the exterior threads 102 on the cylindrical portion 48 of valve body 36.

Figure 1A:
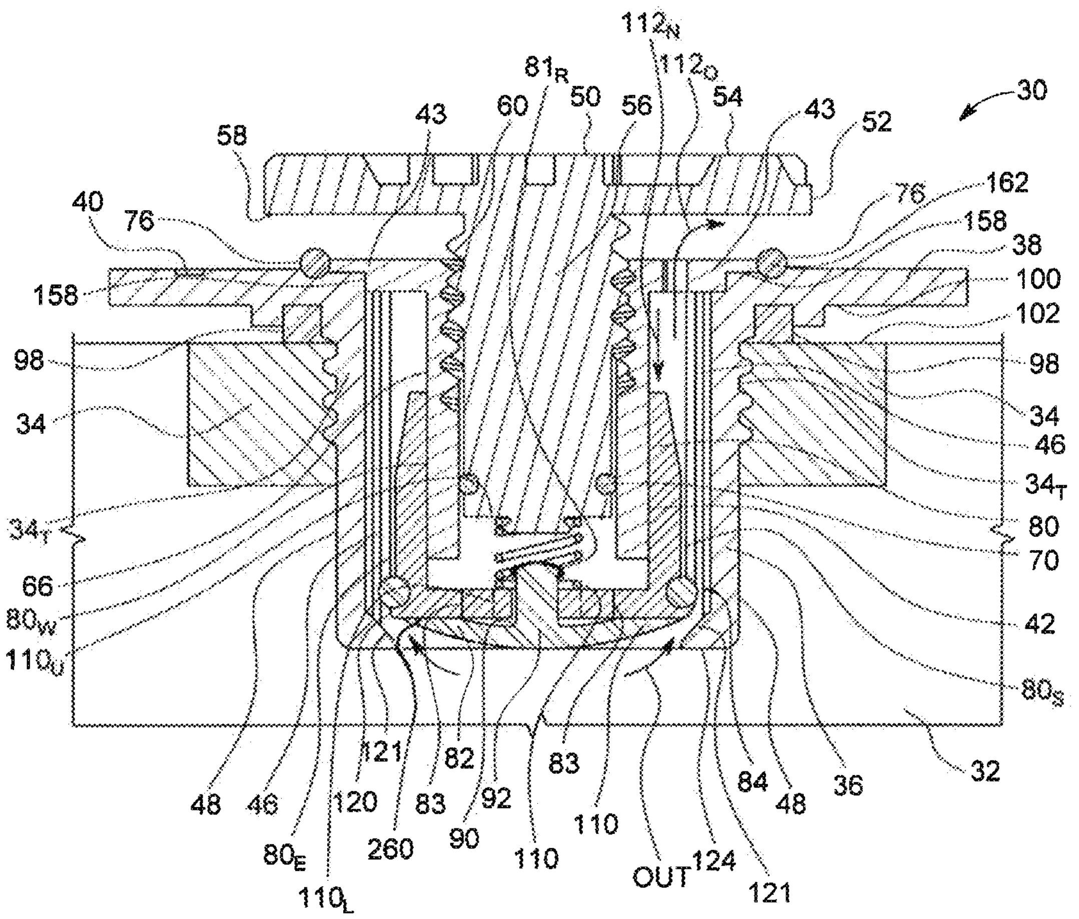
Figure 1B:
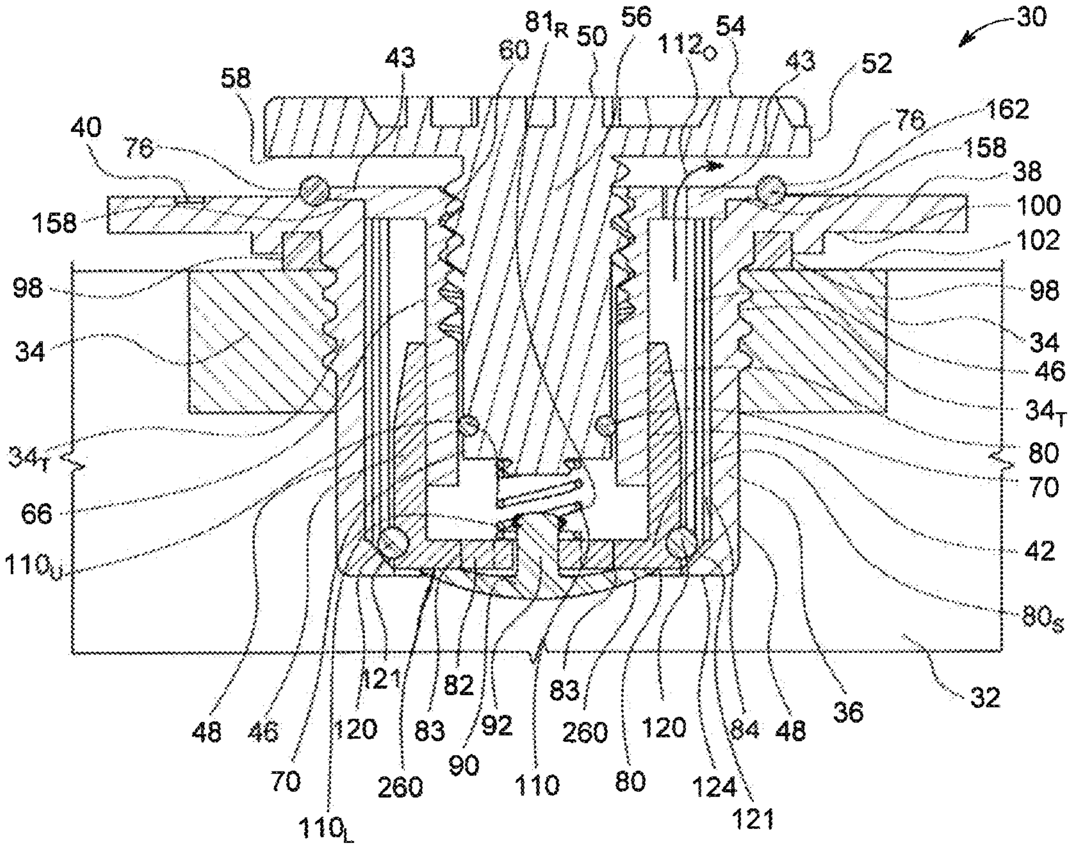

As can be seen in FIG. 1, a compression spring 110 is sized and shaped for acting on plunger 80, and in operation, the amount of force used for compression of the spring 110 between plunger 80 and the lower end of shaft 56 is adjustable by a user. As seen in FIG. 1A, air may be drawn from the outside to fill the self-inflating mattress 32, as indicated by reference arrow $\mathbf{112}_{N}$. Or, as shown in FIG. 1B, by placing the preload selector knob in an intermediate position, air may be expelled to the outside from the air inflating mattress, as indicated by reference arrow $\mathbf{112}_{O}$, to reduce the firmness (hardness) of the mattress 32. This enables a user to adjust the softness or hardness of the self-inflating mattress 32, by limiting the amount of air expelled from the mattress 32, depending on the point at which the check valve 30 opens to allow air to escape from the mattress 32. Thus, there are multiple settings for firmness of a self-inflating mattress, each having a different compressive force exerted by the preload compression spring 110. Finally, the plunger gasket 120 provides a seal between the bottom 81 of the plunger (see FIG. 2) and the sealing surface 121 at the lower end 124 of the vertically extending cylindrical portion 48 of the valve body 36.

Shown in FIG. 2 is an exploded vertical cross-section view of a compact check valve 30, as just illustrated in FIG. 1 above. Thus, the valve body 36 includes an outwardly extending annulus shaped flange 38 on which operating indicia may be provided. The preload guide insert 66 is likewise configured for interlocking engagement with the valve body 36, as further explained below.

Figure 3:
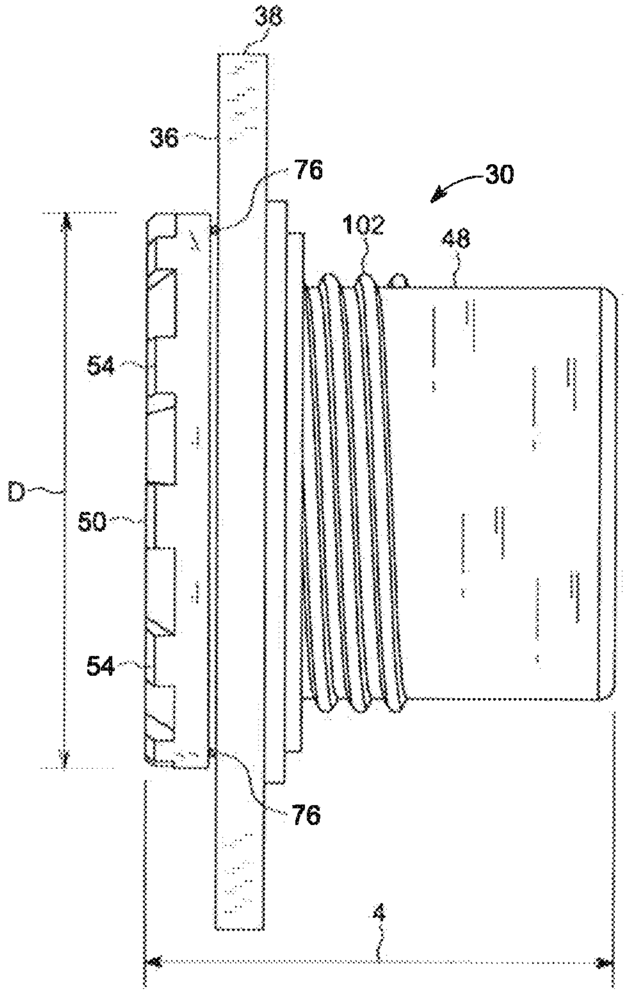
FIG. 3 is a side elevation view of a compact check valve assembly, as just illustrated in FIGS. 1 and 2 above, showing a valve body with an outwardly extending annulus shaped flange on the upper portion thereof, a downwardly extending tubular cylindrical element on which external threads are provided, which are used to secure the valve body in mating engagement with complementary threads on a mounting coupling in a self-inflating bed, as well as the adjustable preload knob at the top.

Attention is directed to FIG. 3, where a side elevation view of a compact check valve 30, as just illustrated in FIGS. 1 and 2 above, is provided. Additionally, the compact height H may be provided, of about 1.5 inches, more or less. In an embodiment, H may be about 1.46 inches. Likewise, a compact diameter D may be provided, of about 1.75 inches, more or less. In an embodiment, diameter D (of the preload selector knob, i.e. without the flange 38, and thus corresponding to the overall size for the compact check valve embodiment 130 seen in FIGS. 19A, 19B, 20, and 21) may be about 1.72 inches. This compact size provides a check valve (30, 130) which is unobtrusive to a user of a self-inflating bed.

Figure 4:
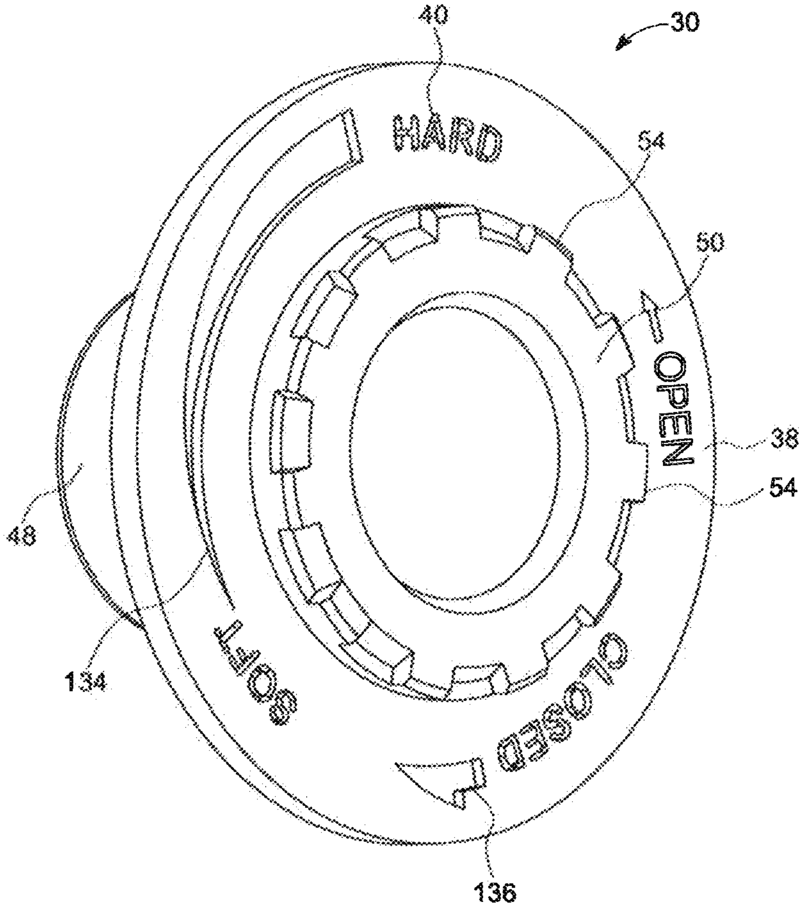
FIG. 4 is a perspective view of a compact check valve as just illustrated in FIGS. 1 and 3, now showing both the preload knob and the annular flange of the valve body, and additionally illustrating the pointing arrows and position indicators provided on the obverse surface of the annular flange, using the word or acronyms SOFT and HARD, as well as a directional arrows and words indicating the CLOSED direction and the OPEN direction for rotary movement of the preload knob.

FIG. 4 is a perspective view of a compact check valve as just illustrated in FIGS. 1 and 3, now showing the preload selector knob 50, as with pointing arrows 132 and position indicators 40 provided on the annular flange 38 of the valve body 36. In FIG. 4, the words SOFT, HARD, OPEN, and CLOSED are used, as well as a directional arrow 134 for adjustment, and 136 for closure. In an embodiment, a compact check valve may be adjustable to anywhere between the OPEN and the CLOSED position in order to set a desired degree of firmness in the self-inflating mattress.

Figure 5:
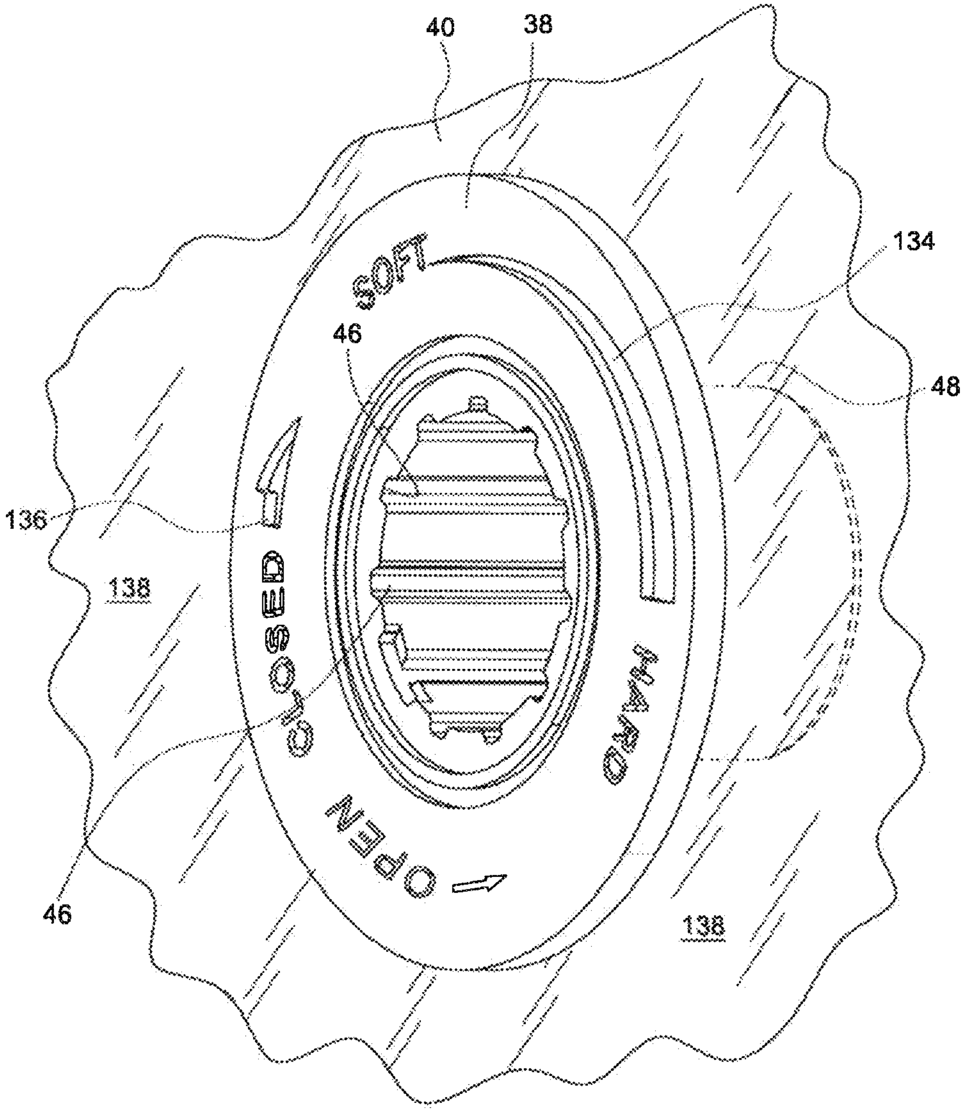
FIG. 5 is a top perspective view of a valve body for a compact check valve, (a) showing the pointing arrows and position indicators provided on the annular flange of the valve body, using the word or acronyms SOFT and HARD, as well as directional arrows and words indicating the CLOSED direction and the OPEN direction for movement of the preload knob, (b) further showing a portion of an embodiment utilizing an internally slotted cylinder provided as part of the valve body (the slots act both as anti-rotation elements and as air passageways), (c) showing the gasket seat for receiving a knob gasket that provides a seal to the underside of the preload selector knob, as better seen in FIG. 1, and additionally showing that in an embodiment, the flange provided on the valve body may be directly bonded/welded (e.g., thermally) to an upper surface of a self-inflating mattress, rather than using a threaded flange and mattress gasket as illustrated in FIG. 1 above.
Figure 6:
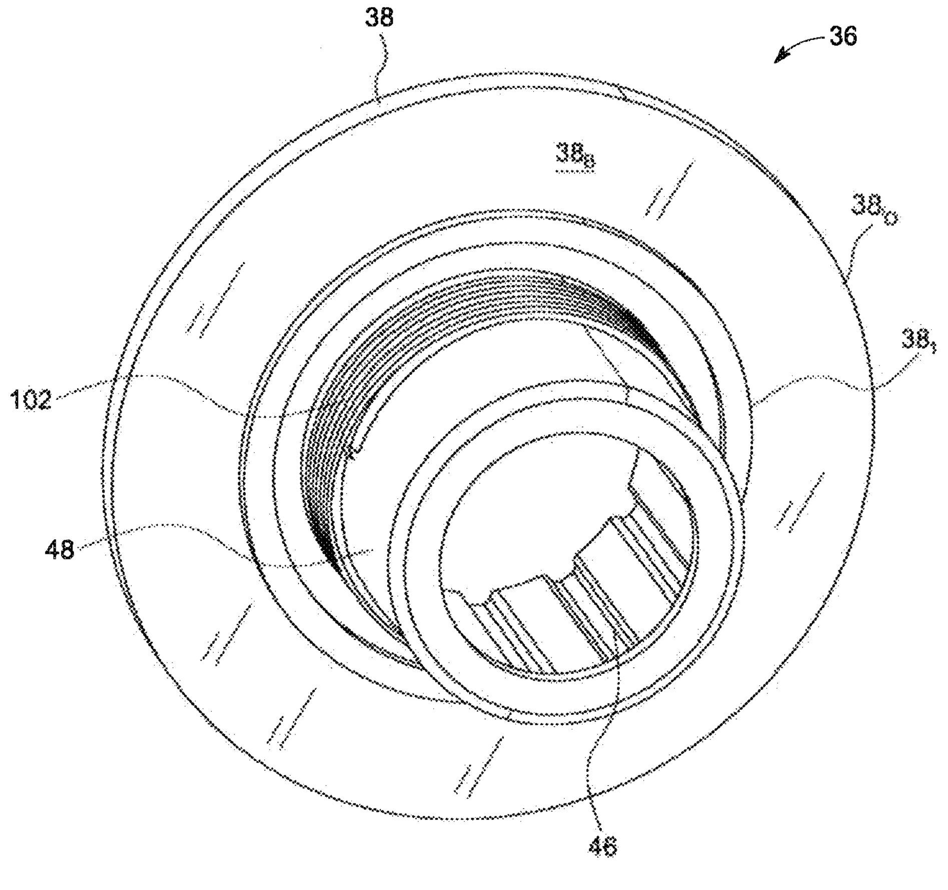
FIG. 6 is a bottom perspective view of a valve body for a compact check valve, now illustrating a portion of an internally slotted cylinder that may be provided as part of the valve body, and showing external threads provided on the downward extending tubular cylinder which may be used in securing the compact valve to a self-inflating mattress, in the manner illustrated in FIG. 1 above.
Figure 7:
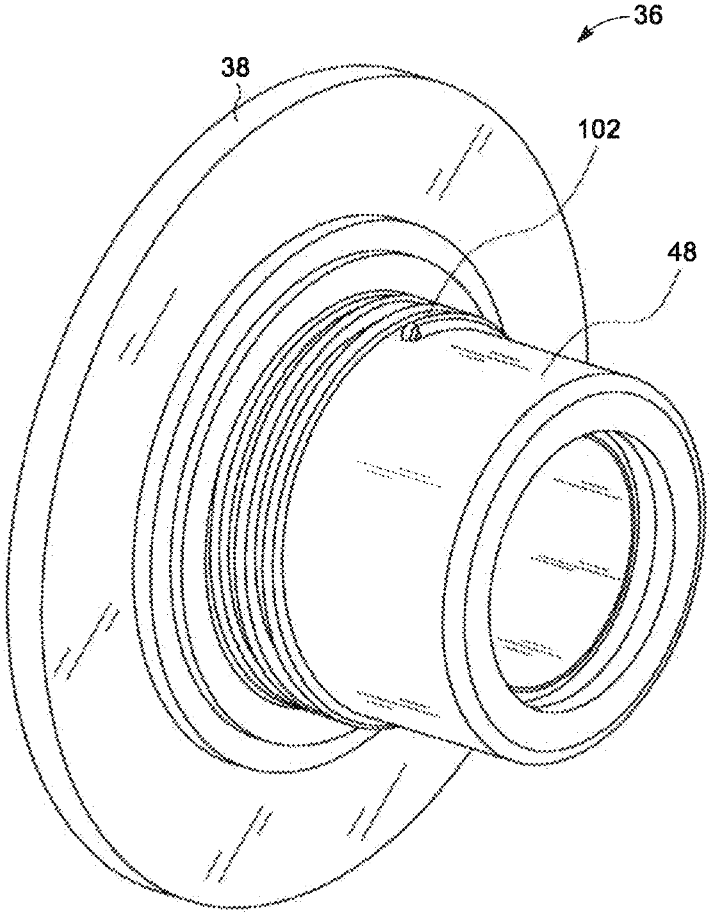
FIG. 7 is also a perspective view of a valve body for a compact check valve, similar to the view just provided in FIG. 6, showing external threads provided on the downward extending cylinder of the valve body, for use in securing the compact valve to a self-inflating mattress in the manner illustrated in FIG. 1 above.
Figure 8:
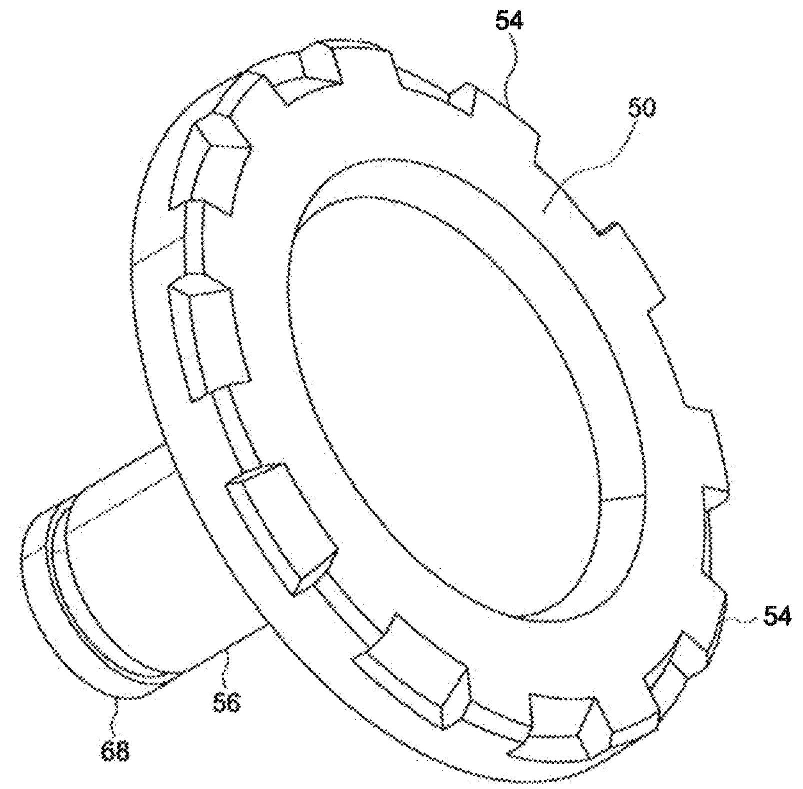
FIG. 8 is a top perspective view of an embodiment for a preload knob for a compact check valve, showing the use of gripping knurls around the perimeter of the preload knob, which are provided for use by a user in manipulating the preload knob, and also illustrating a portion of a seat for an anti-backout O-ring (not shown) which may be provided transversely oriented with respect to the downwardly extending shaft of the preload knob.

In general, FIGS. 5 through 9 show enlarged views of various components already discussed, and to that extent, it is not necessary to further point out such features in view of the discussion set out elsewhere herein. However, FIG. 5 additionally illustrates that in an embodiment, an embodiment for a flange 38 may be provided on the valve body 36 with a flat bottom surface, which may be directly bonded or welded to the self-inflating mattress 32, such as with the surface 138 of an air impervious plenum as seen in FIG. 5. This is an alternate configuration, rather than using a threaded flange 34 as noted in FIG. 1 above. In an embodiment such as shown in FIG. 5, the flange 38 may have a flat bottom surface, wherein the flat bottom surface has an inner diameter 381 and an outer diameter 380, and wherein the bottom surface 38B between the inner diameter and the outer diameter provides the surface area for secure permanent bonding to the upper surface 138 of an air impervious plenum of a self-inflating mattress 32 (see FIG. 6, although no threads 102 would be required).

Figure 10:
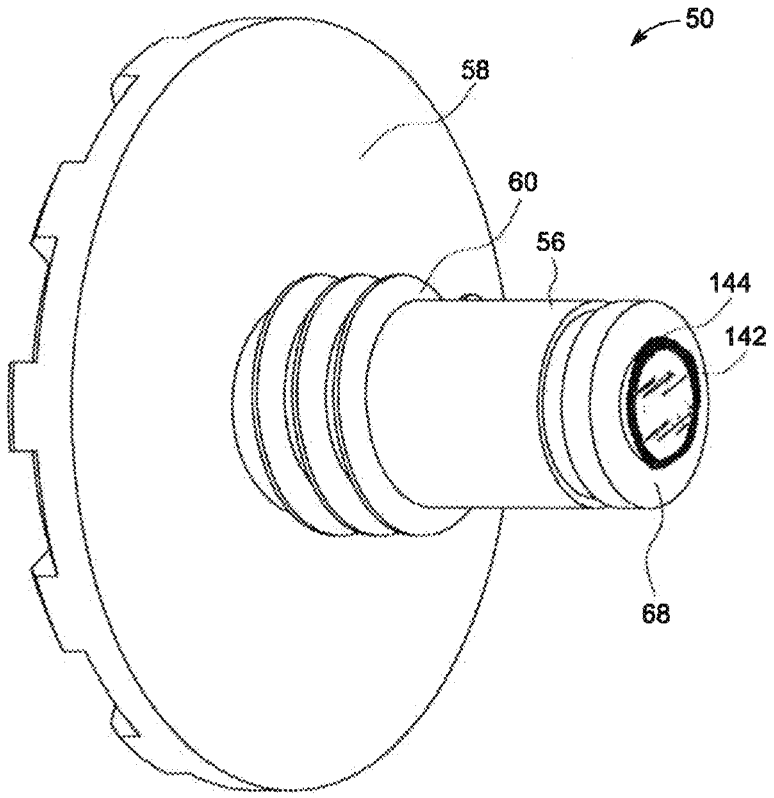
FIG. 10 is a perspective view of the underside of a preload knob for a compact check valve, showing some of the gripping knurls around the perimeter of the preload knob, and the downwardly extending shaft, the upper portion of which is provided with external threads for complementary threaded engagement with the interior threads in the preload guide portion of the compact check valve, and a nipple having a radially expanded distal portion sized and shaped for working engagement with and retention of a preload spring (see also FIG. 19A and FIG. 27).

FIG. 10 provides a perspective view of the underside of a preload selector knob 50, with further detail of the downwardly extending shaft 56, where the upper portion is provided with external threads 60 for complementary threaded engagement with the interior threads 62 in the preload guide portion 66 (see FIG. 2 above). Also shown is the hollow opening 140 at the bottom, and a nipple 142, with a radially expanded distal portion 144 sized and shaped for working engagement with an upper end 110*u* (see FIG. 27) of the preload spring 110. As seen in FIG. 1, a lower end 110L of the preload compression spring 110 attaches to a retainer 81R in the plunger 80.

Figure 11:
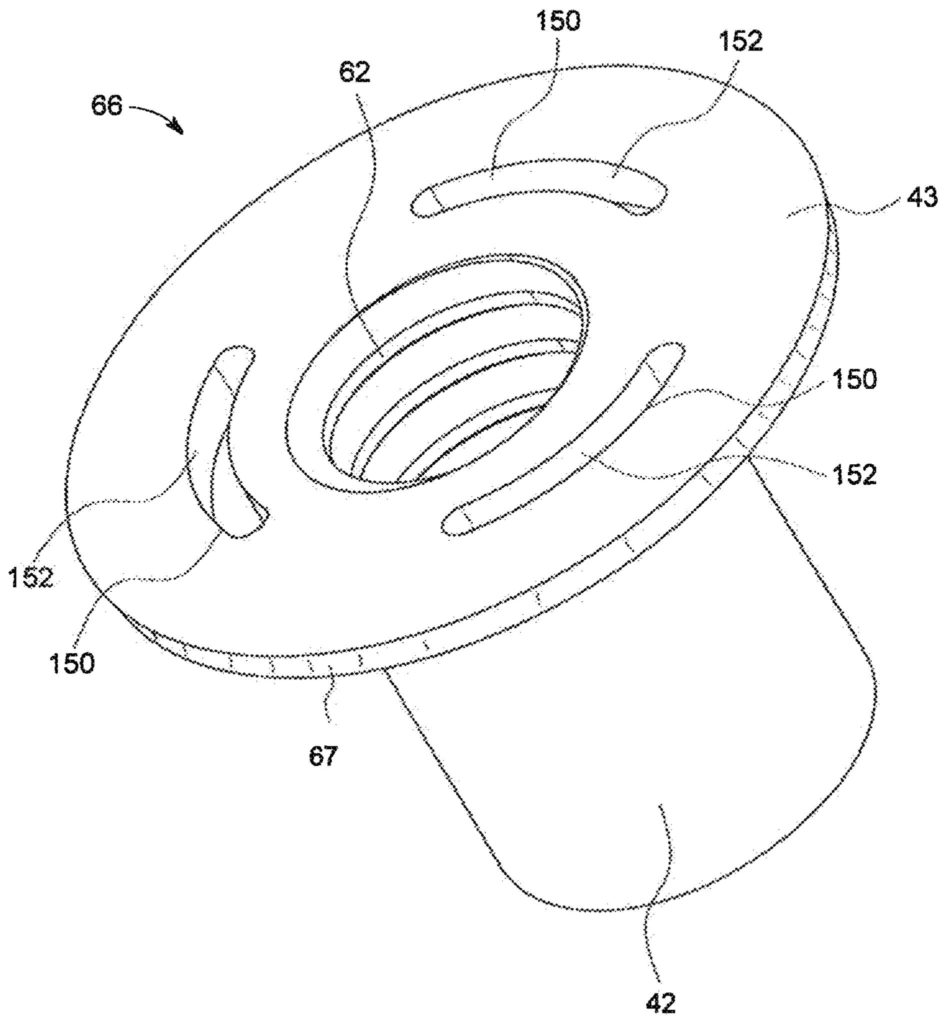
FIG. 11 is a top perspective view of an embodiment for a preload guide for a compact check valve, showing a flange portion and a central hollow cylinder portion, and further showing internal threads sized and shaped for complementary threaded engagement with threads on the exterior of the downwardly extending shaft of the preload knob, as well as a plurality of slots which are provided for passage therethrough of air from an air impervious plenum of the self-inflating mattress.

Attention is now directed to FIG. 11, which provides a top perspective view of a preload guide 66 for a compact check valve (30, 130). The preload guide 66 includes a preload flange portion 43 and a central hollow cylinder portion 42. The central hollow cylinder portion 42 includes internal threads 62 sized and shaped for complementary threaded engagement with external threads 60 on the exterior of the cylinder portion 56 of the preload selector knob 50. Additionally, a plurality of guide slots 150, defined by guide slot sidewalls 152, are provided for passage therethrough of air from an air impervious plenum of the self-inflating mattress.

Figure 12:
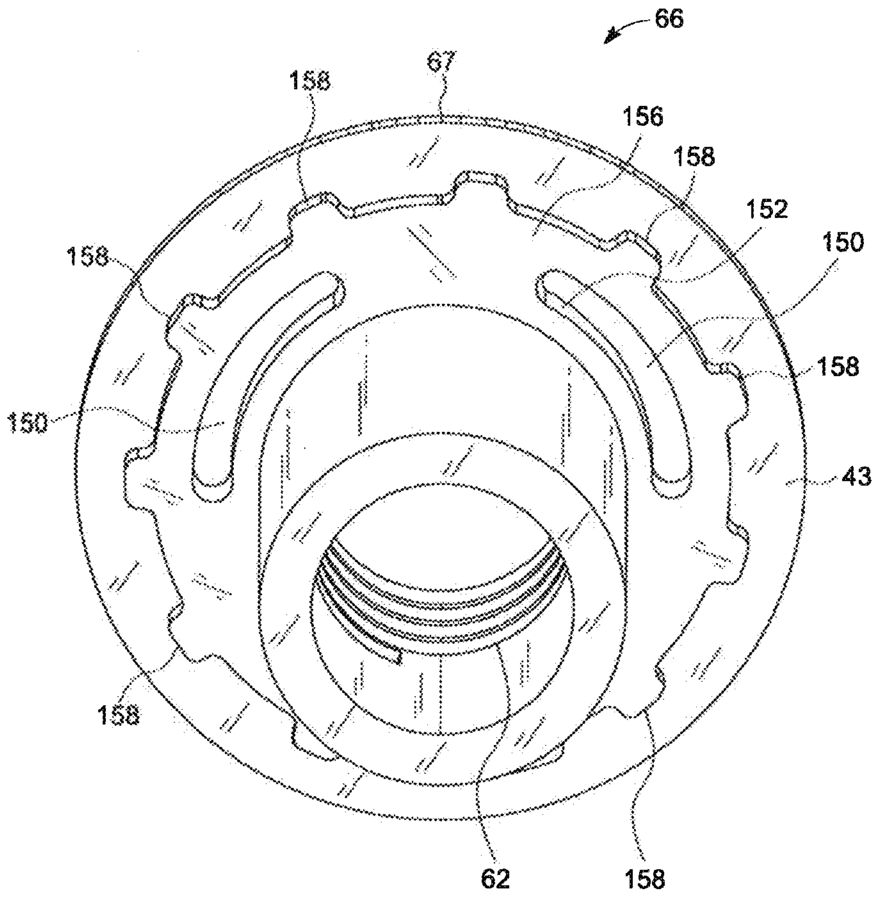
FIG. 12 is a bottom perspective view of an embodiment for a preload guide for a compact check valve as just illustrated in FIG. 11, now showing, from below, the reverse side of the flange portion, where a ring shaped gear portion with distally extending teeth is provided, with the teeth sized and shaped for interlocking engagement with complementary shaped slots in the internally slotted cylinder provided as part of the valve body, to provide an anti-rotation functionality so as to prevent rotational movement therebetween, and also illustrating the underside opening of the plurality of slots as just noted in FIG. 11 above.
Figure 13:
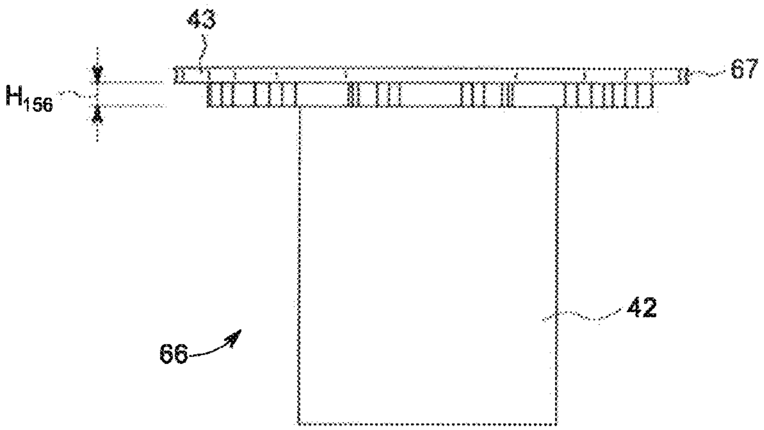
FIG. 13 is a side elevation view of an embodiment for a preload guide for a compact check valve as just illustrated in FIGS. 11 and 12, now showing below the flange portion the thin ring shaped gear portion with distally extending teeth, with the teeth sized and shaped for interlocking engagement with complementarily shaped slots in the internally slotted tubular cylinder provided as part of the valve body (see FIG. 5), and also illustrating a retaining flange at the peripheral edge thereof.
Figure 14:
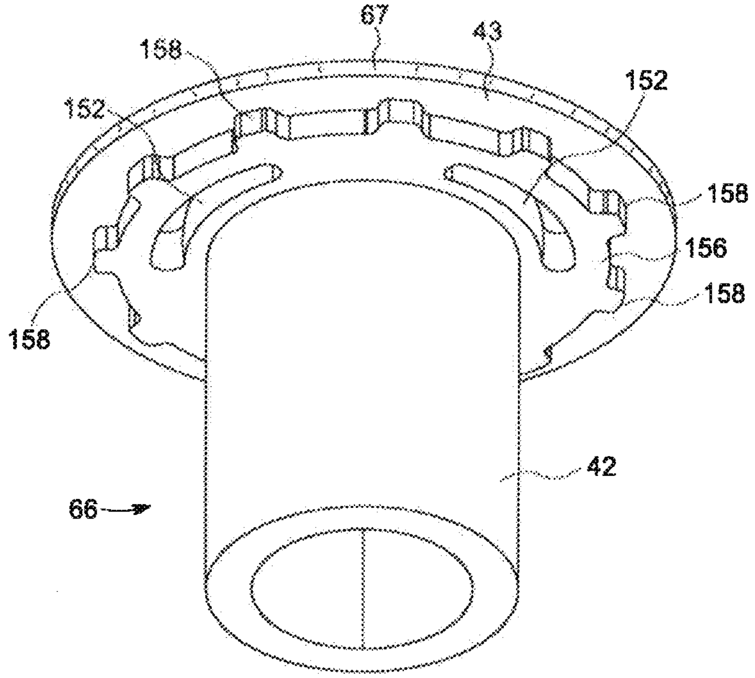
FIG. 14 is a bottom perspective view of a preload guide for a compact check valve as just illustrated in FIG. 12, showing below the flange portion a ring shaped gear portion with distally extending teeth, with the teeth sized and shaped for interlocking engagement with complementarily shaped slots in the internally slotted tubular cylinder provided as part of the valve body, as well as showing the underside opening of some of the plurality of slots that are provided for movement of air therethrough as just noted in FIG. 11 above.

Further details of the preload guide 66 are shown in FIGS. 12, 13, and 14. FIG. 12 is a bottom perspective view of a preload guide 66, now showing below the flange portion 43 a ring shaped gear portion 156 with distally extending teeth 158. The one or more teeth 158 are sized and shaped for interlocking engagement with the complementarily sized and shaped vertical slots 46 in the internally slotted generally tubular cylinder 48 provided as part of the valve body 36. Additionally, FIG. 13 provides a side elevation view of a preload guide 66, FIG. 13 illustrates the thin height $H_{156}$ Of the gear portion 156. FIG. 15 provides further details for the gear portion 156, as well as passageways which are provided both through the gear portion 156 and the flange 43 there above.

Figure 18:
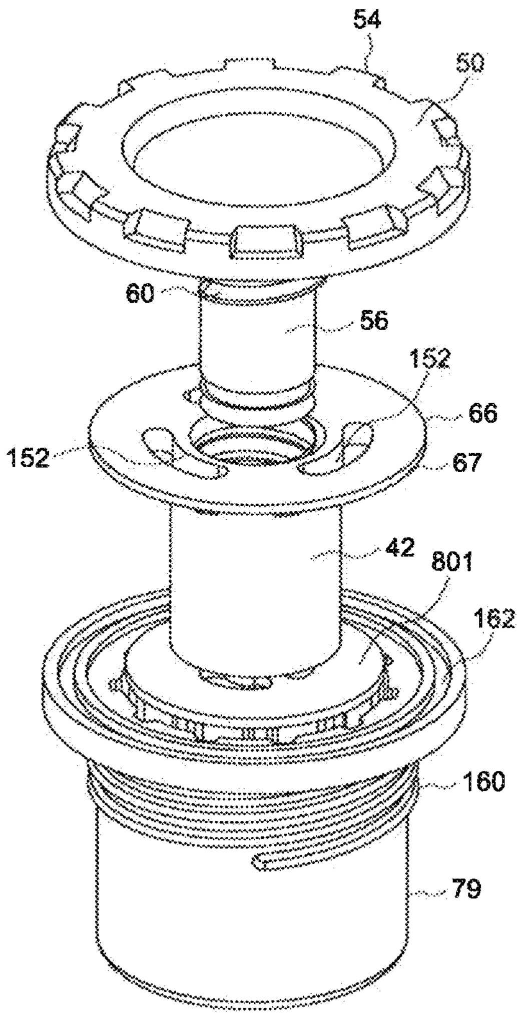
FIGS. 18, 19A, and 19B, are views of another embodiment for a compact check valve, similar in function to the embodiment illustrated in FIGS. 1-17 above, but now omitting the outwardly extending flange with instructions thereon (see FIGS. 4 and 5 above) as part of the valve body, and using a plunger having the configuration of a compact, flat circular plunger as set out in FIGS. 15A, 16A, and 17A above.

FIGS. 18, 19A, 19B, 20, and 21 provide various views of yet another embodiment for a compact check valve 130. The components and functionality of check valve 130 are substantially as shown and described in relation to check valve 30 discussed above. However, check valve 130 omits the use of an outwardly extending flange 38 as seen in FIGS. 1-3 above on check valve 30. The basic components of check valve 130 are shown in FIG. 18, namely preload selector knob 50, a preload guide 66, and a valve body 79 with external threads 160. Gasket seat 162 is provided in valve body 79 for a knob gasket 76, similar to the configuration for check valve 30.

Figure 19B:
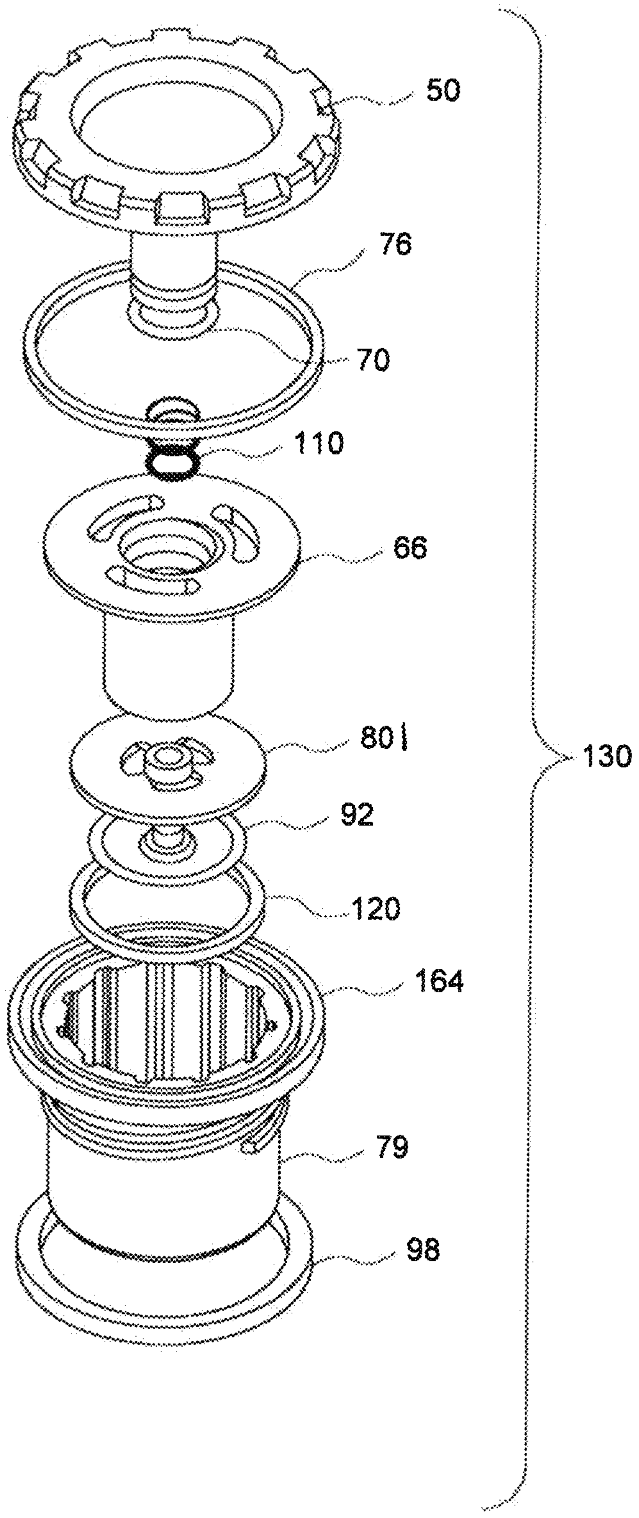

Attention is directed to FIGS. 19A and 19B. In FIG. 19A, a vertically exploded side elevation view of the components of a compact check valve 120 are illustrated. This figure shows, from the top, (1) the preload selector knob 50;
(2) an anti-backout O-ring 70;
(3) a knob gasket 76 for sealing the gap between the underside 58 of the preload selector knob 50 and the top 164 of the valve body;
(4) a preload compression spring 110;
(5) a preload guide 66;
(6) a plunger 801;
(7) an umbrella valve 92;
(8) a plunger gasket 120 for sealing the gap between the underside 122 of the plunger 801 and an interior wall 124 at the lower end of the vertically extending cylinder 48 of the valve body 79;
(9) a valve body 79 that has a vertically extending cylindrical portion 48 having external threads 160 for attachment of the compact check valve 130 to a self-inflating mattress having a receiving threaded flange 34 therein with threads 34T that are complementary in size and shape; and
(10) a mattress gasket 98, for sealing the joint between the check valve 130 and the threaded flange 34.

FIG. 19B is a vertically exploded perspective view of the components of a compact check valve 130, as illustrated in FIG. 19A and just described above.

Figure 20:
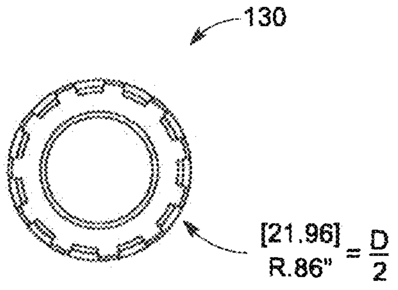
FIG. 20 is a top view, taken looking down on a preload selector knob, showing an embodiment for a knurled perimeter of a preload selector knob, where the knurled protrusions are provided to help a user manipulate the preload selector knob; the exemplary dimensions are included to emphasize the compact size which may be achieved, which minimizes visibility and contact while in use with a mattress.
Figure 21:
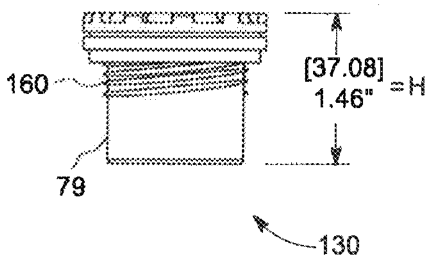
FIG. 21 is a side elevation view of the components of an embodiment for a fully assembled compact check valve, illustrating the compact nature of the check valve when internal components (shown above in FIGS. 19A and 20) are nested internally in a working position; exemplary dimensions are included to emphasize the compact size which may be achieved, which minimizes visibility and contact while in use with a mattress.

FIG. 20 provides a top view of compact check valve 130, and illustrates the small radius, of zero point eight six inches (0.86 inches or 21.96 mm), which may be provided. This view also shows knurls 54 on the perimeter of the preload selector knob 50 that may help a user manipulate the knob 50. Similarly, FIG. 21 provides a side elevation view of compact check valve 130, wherein all components illustrated in FIGS. 19A and 19B are fully assembled, illustrating the compact nature of the check valve when internal components are nested internally in a working position. As shown in FIG. 21, in an embodiment, the height H of the compact check valve 130 is only one point four six inches (1.46 inches, or 37.08 mm).

Figure 22:
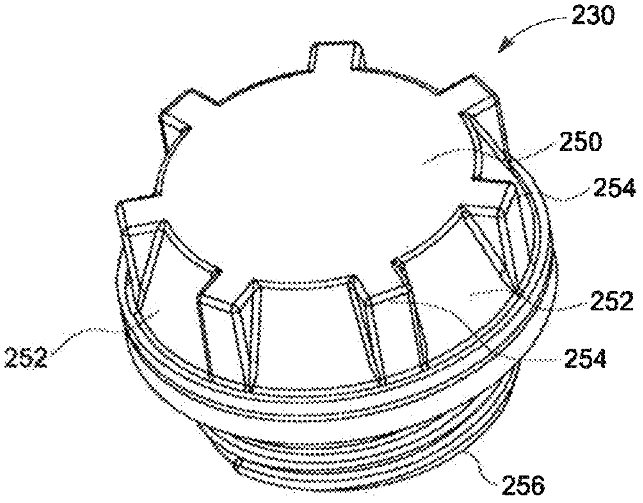
FIGS. 22, 23, and 24, show yet another embodiment for a compact check valve, similar in size and function to the valve shown in FIG. 21, but now using a different design for the preload selector knob; components which may be utilized for this embodiment are illustrated in FIGS. 25 through 29.

Attention is now directed to FIGS. 22, 23, 24, 25, and 26 show yet another embodiment for a compact check valve 230, similar in size and function to the compact check valve 130 shown in FIG. 21, but now using a different design for a preload selector knob 250. In FIG. 22, a top perspective view of a fully assembled compact check valve 230 is provided. This drawing figure shows an embodiment in which the preload selector valve 250 uses inward sloping perimeter walls 252, with a knurled knob 254 design for ease of grip by a user. External threads 256 on cylindrical valve body 258 are used as described above for attachment of the compact check valve 230 to a self-inflating bed 32.

Figure 23:
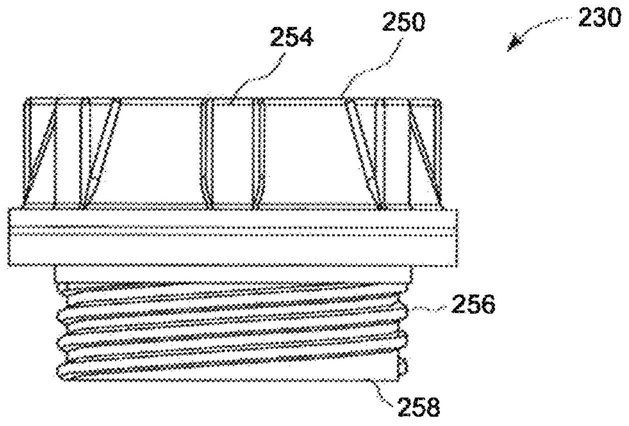
Figure 24:
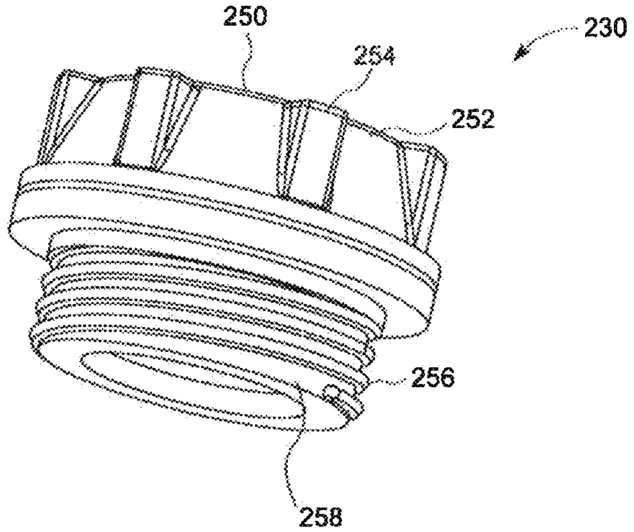

In FIG. 23 is a side elevation view of the components of an embodiment for a fully assembled compact check valve 230 is provided, as just illustrated in FIG. 22 above, but now again illustrating the compact nature of the check valve 230 when internal components (similar in shape and function as those shown above in FIG. 19A) are nested internally in a working position. FIG. 24 provides a bottom perspective view of the components of a fully assembled compact check valve 230.

Figure 25:
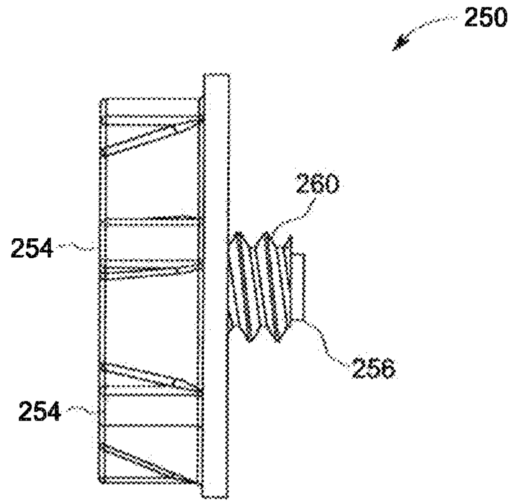
FIG. 25 is a side view of an embodiment for a preload selector knob, as maybe used in the compact check valve shown in FIGS. 22 and 23 above, showing the preload selector knob with a knurled knob design for ease of grip by a user, and showing the internal downwardly extending hollow cylinder portion of the preload selector knob, with external threads.
Figure 26:
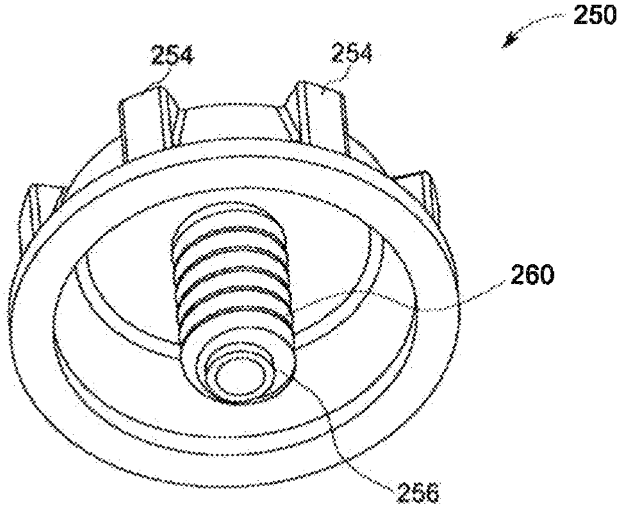
FIG. 26 is a bottom perspective view of an embodiment for a preload selector knob, as maybe used in the compact check valve shown in FIGS. 22 and 23 above, showing the preload selector knob with a knurled knob design for ease of grip by a user, and also showing the internal downwardly extending hollow cylinder portion of the preload selector knob, with external threads.

FIGS. 25 and 26 provide views of an embodiment for a preload selector knob 250, as maybe used in the compact check valve 230 shown in FIGS. 22 and 23 above. Here, the preload selector knob 250 uses a knurled knob design with knurls 254 for ease of grip by a user. An internal downwardly extending hollow cylinder portion 256 is provided internally in the preload selector knob 250, with external threads 260. Otherwise, the compact check valve 230 is configures as noted above with respect to check valves 30 and 130.

Figure 27:
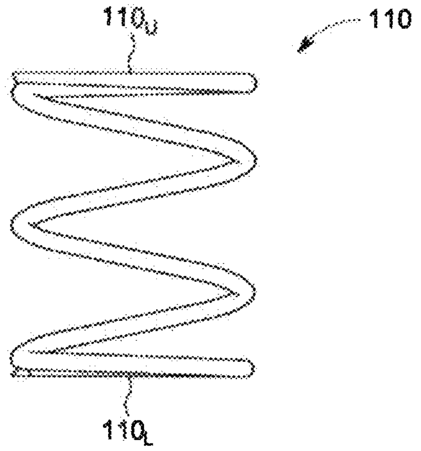
FIG. 27 illustrates an embodiment for a preload spring, which may be provided in the form of a compression spring for location and operation to exert force between the plunger and the lower distal end of the cylinder portion of a preload selector knob, as useful in the various embodiments depicted herein.

FIG. 27 illustrates an embodiment for a preload spring 110. The preload spring 110 may be provided in the form of a compression spring that is sized and shaped for location and operation between the plunger 80 and the lower distal end or nipple 142 of the hollow cylinder portion 56 of a preload selector knob (50 or 250), as noted in FIGS. 9 and 10 above.

Figure 28:
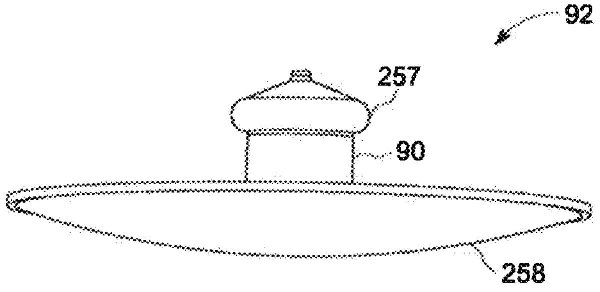
FIGS. 28 and 29 illustrate an embodiment for an umbrella valve, located at the lower end of compact check valve in the various embodiments depicted herein.
Figure 29:
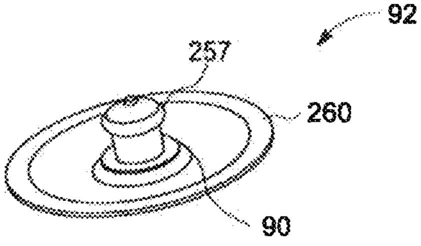

FIGS. 28 and 29 illustrate an embodiment for an umbrella valve 92, which is located at the lower end of compact check valve (30, or 130, or 230). FIG. 28 provides side elevation view of an embodiment for an umbrella valve 92 design which may be useful in a compact check valve, showing a centrally located upwardly extending stem 90 with keeper head 257 that is used to hold the umbrella valve 92 in place. An umbrella valve 92 has a preloaded convex shape 258 that is useful to create a sealing force against a valve seat, as provided by the plunger 80. Additionally, as noted in FIG. 29, an umbrella valve may be provided in an embodiment having a flat sealing flange 260 around the perimeter thereof. Suitable umbrella check valves are available from Vernay Laboratories, Inc. of Griffin, Georgia, United States, as seen for example at their website, found at https://www.vernay.com/Markets/Medical/Product-Categories/Umbrella-Check-Valves.aspx. In an embodiment, an umbrella check valve 92 may include centrally located elongated elastic stem 90 which includes, at the distal end, a laterally enlarged keeper head 257 which provides a stop that is sized and shaped for installation as shown above. However, other umbrella valve designs may be provided in a compact check valve (30, 130, or 230) and provide acceptable service for the application described herein in connection with use of a self-inflating mattress, and thus, be within the scope and coverage of this description and accompanying claims.

In various embodiments, a compact check valve (30, 130, or 230) may be utilized in various modes of operation, including the following:

(a) Fully Automatic Mode. In this operational mode, a user sets the level of firmness (necessary only once), thus adjusting pressure in the mattress, by turning the preload selector knob 50 counterclockwise from CLOSED (a firm condition) to up to two (2) full 360° rotations, to the softest possible setting. Once the preload selector knob 50 is set, the mattress will re-inflate when not in use. In this manner, the self-inflating mattress returns automatically to the original pressure set by the user. In this mode of operation, the pressure setting always remains constant, despite the mass of the user of the mattress. Conceptually, this mode of operation is illustrated in FIG. 1B.

(b) Manual Mode: In one method of operation, a user, while lying on the bed, unscrews the check valve (30, 130, or 230) until the desired pressure is achieved, then the user screws the check valve back to CLOSED. The self-inflating bed will hold the manually set level of inflation even when the user is not using the bed. The pressure will vary by the mass of the user, when the check valve is manually set.

(c) Storage mode: The compact check valve can be completely unscrewed from the port to the mattress, at the threaded flange 34, and then a vacuum hose can be inserted at the port opening (or affixed to the threaded flange if appropriate fittings are available) and the air impervious plenums of the mattress chamber will each be drawn down and compressed to a fraction of its operating thickness. Once air has been evacuated from the self-inflating mattress, the compact check valve (30, 130, or 230) can be screwed back into the port provided by the threaded flange 34, and CLOSED, thus maintaining the compressed form of the mattress, for easy packing and transport. For faster re-inflation, the compact check valve (30, 130, or 230) can be unscrewed from threaded flange 34, opening the air inlet port, and the mattress 32 will completely re-inflate in less than a minute.

In the foregoing description, for purposes of explanation, numerous details have been set forth in order to provide a thorough understanding of the disclosed exemplary embodiments for the design of a check valve assembly. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more structures may be simultaneously provided or eliminated in part or in whole while other elements may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

It will be understood by persons skilled in the art that various elements useful for configurations of compact check valves for use with self-inflating bed designs have been described herein only to an extent appropriate for such skilled persons to make and use such check valve assemblies in combination with self-inflating beds. Additional details may be worked out by those of skill in the art for a selected set of specifications, useful life, materials of construction, and other design criteria, such as comfort level or firmness of the self-inflating bed.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Although only certain specific embodiments of the present invention have been shown and described, the invention is not limited to such embodiments. Rather, the invention is to be defined by the appended claims and their equivalents when taken in combination with the description.

Numerous modifications and variations are possible in light of the above teachings. Therefore, the protection afforded to this invention should be limited only by the claims set forth herein, and the legal equivalents thereof.

The invention claimed is:

1. A compact check valve, the compact check valve for controlling fluid flow into, or out of, or both into and out of, a pneumatic self-inflating mattress configured for operation in ambient atmospheric conditions, the compact check valve comprising:

(a) a preload selector knob, the preload selector having a top and a bottom, the top generally circular in shape and having a perimeter with knurls along the perimeter, the preload selector further comprising a downwardly extending shaft, the downwardly extending shaft having a longitudinal axis and a distal end, the downwardly extending shaft having a threaded portion at least along an upper portion thereof, the downwardly extending shaft further including around a lower portion thereof, an anti-backout seal;

(b) a valve body, the valve body having a top and a centrally located downwardly extending generally tubular cylindrical portion having an interior sidewall, and extending at least along a portion of the interior sidewall, vertically extending slots;

(c) a knob gasket, the knob gasket operably configured to seal a gap between the bottom of the preload selector knob and the top of the valve body;

(d) a preload guide;

(e) a plunger, the plunger having an underside and an upper side;

(f) an umbrella valve, the umbrella valve comprising a stem;

(g) a plunger gasket, the plunger gasket operable to seal, or to unseal, a gap between the underside of the plunger and the interior sidewall of the centrally located downwardly extending generally tubular cylindrical portion of the valve body; and (h) a preload compression spring the preload compression spring affixed to the distal end of the downwardly extending shaft and located to exert compressive force between the downwardly extending shaft and the upper side of the plunger.

2. The compact check valve as set forth in claim 1, wherein the valve body further comprises, on the vertically centrally located downwardly extending cylindrical portion, external threads, wherein the external threads are sized and shaped for threaded engagement with a threaded flange provided on the pneumatic self-inflating mattress.

3. A compact check valve as set forth in claim 1, wherein the distal end of the downwardly extending shaft further comprises a nipple having a radially expanded distal portion, the radially expanded distal portion sized and shaped for secure working engagement with an upper end of the preload compression spring.

4. A compact check valve as set forth in claim 1, wherein the plunger further comprises an interior bottom wall, the interior bottom wall comprises an upwardly extending spring retainer, the upwardly extending spring retainer sized and shaped for secure interfitting contact with a lower end of the preload compression spring.

5. A compact check valve as set forth in claim 1, wherein the preload selector knob is adjustable.

6. A compact check valve as set forth in claim 5, wherein the preload selector knob is adjustable between multiple settings, each of the multiple settings having a different compression force exerted by the preload compression spring, so as to provide different degrees of firmness in the pneumatic self-inflating mattress to which the compact check valve is affixed.

7. A compact check valve as set forth in claim 5, wherein the preload selector knob is moveable between a closed position and an open position.

8. A compact check valve as set forth in claim 7, wherein the preload selector knob is moveable to a user selected position anywhere between the open and the closed position.

9. A compact check valve as set forth in claim 1, wherein the valve body further comprises an outwardly extending annular flange portion at or near the top of the valve body.

10. A compact check valve as set forth in claim 9, wherein the outwardly extending annular flange portion comprises a flat bottom surface, the flat bottom surface having an inner diameter and an outer diameter, and wherein the flat bottom surface between the inner diameter and the outer diameter provides a surface area for secure permanent bonding to an air impervious plenum of the pneumatic self-inflating mattress.

11. A compact check valve as set forth in claim 9, wherein the outwardly extending annular flange portion comprises an upper surface, and wherein operating indicia are provided for instructing a user for a direction of movement of the preload knob for an open position and for a closed position.

12. A compact check valve as set forth in claim 11, wherein the operating indicia further include directional instructions of HARD and SOFT so as to enable the user to move the preload selector to achieve a user desired condition of a degree of firmness in the pneumatic self-inflating mattress.

13. A compact check valve as set forth in claim 1, wherein the preload guide further comprises (a) an upper flange and (b) a downwardly extending tubular cylindrical portion, wherein the downwardly extending tubular cylindrical portion further comprises a threaded interior sidewall, the threaded interior sidewall comprising threads sized and shaped for adjustable threaded interaction with the threaded portion of the downwardly extending shaft of the preload selector knob.

14. A compact check valve as set forth in claim 13, wherein the preload guide further comprises an anti-rotation gear portion below the flange portion, and wherein the anti-rotation gear portion further comprises one or more distally extending teeth, wherein the one or more distally extending teeth are sized and shaped for interlocking engagement with the vertically extending slots in the interior sidewall of the valve body.

15. A compact check valve as set forth in claim 13, wherein the upper flange of the preload guide further comprises one or more preload guide slots, the one or more preload guide slots defined by guide slot sidewalls, and wherein the guide slots are provided for passage of air therethrough.

16. A compact check valve as set forth in claim 13, wherein the downwardly extending tubular cylindrical portion of the preload guide further comprises a tubular cylindrical wall portion, and wherein the anti-backout seal is sized and shaped for sealing engagement with the tubular cylindrical wall portion.

17. A compact check valve as set forth in claim 16, wherein the anti-backout seal comprises an O-ring.

18. A compact check valve as set forth in claim 17, wherein the O-ring is positioned orthogonally to the longitudinal axis of the downwardly extending shaft.

19. A compact check valve as set forth in claim 1, wherein the plunger is provided in a cup shape having interior sidewalls sized and shaped for close fitting slidable engagement with the downwardly extending tubular cylindrical portion of the preload guide.

20. A compact check valve as set forth in claim 19, wherein the plunger further comprises, between the underside and the upper side, air passageways defined by air passageway sidewalls.

21. A compact check valve as set forth in claim 19, wherein the plunger further comprises (a) a vertically extending outer surface, wherein the vertically extending outer surface comprises a generally cylindrical surface, and wherein the vertically extending outer surface further comprises a lower portion having thereon a peripherally extending seat, the peripherally extending seat sized and shaped to locate therein a selected seal, and (b) the selected seal.

22. A compact check valve as set forth in claim 21, wherein the selected seal comprises an O-ring seal.

23. A compact check valve as set forth in claim 22, wherein the valve body further comprises, at a lower end thereof, a downwardly and inwardly beveled sealing surface, the Inwardly beveled sealing surface sized and shaped to receive the O-ring seal on the plunger, so as to prevent airflow therebetween, when the plunger is moved to a closed position.

24. A compact check valve as set forth in claim 1, wherein the plunger further comprises a retainer sized and shaped to secure thereto the stem of the umbrella valve to the plunger.

25. A compact check valve as set forth in claim 24, wherein the plunger further comprises, on the underside thereof, a peripheral seal, and wherein the umbrella valve comprises an upwardly oriented sealing flange, and wherein the peripheral seal and the upwardly oriented sealing flange are configured for sealing and unsealing operation as a result of operation of the umbrella valve.

26. A compact check valve as set forth in claim 25, wherein the umbrella valve is configured to operably seal the pneumatic self-inflating mattress against air exiting at the plunger for so long as air pressure within the pneumatic self-inflating mattress is lower than force exerted by the preload compression spring.

27. A compact check valve as set forth in claim 26, wherein during inflation of the pneumatic self-inflating mattress, a gap is provided between the plunger gasket and the interior sidewall of the cylindrical portion of the valve body; so that atmospheric air may enter and travel through the compact check valve to the pneumatic self-inflating mattress.

28. A kit for construction of a compact check valve, the compact check valve for controlling fluid flow into, or out of, or both into and out of, a pneumatic self-inflating mattress configured for operation in ambient atmospheric conditions, the kit comprising:

(a) a preload selector knob, the preload selector having a top and a bottom, the top generally circular in shape and having a perimeter with knurls along the perimeter, the preload selector further comprising a downwardly extending shaft, the downwardly extending shaft having a distal end, the downwardly extending shaft having a threaded portion at least along an upper portion thereof, the downwardly extending shaft further including around a lower portion thereof, an anti-backout seal;

(b) a valve body, the valve body having a top and a centrally located downwardly extending generally tubular cylindrical portion having an interior sidewall, and extending at least along a portion of the interior sidewall, vertically extending slots;

(c) a knob gasket, the knob gasket operably configured to seal a gap between the bottom of the preload selector knob and the top of the valve body;

(d) a preload guide;

(e) a plunger, the plunger having an underside and an upper side;

(f) an umbrella valve, the umbrella valve comprising a stem;

(g) a plunger gasket, the plunger gasket operable to seal a gap between the underside of the plunger and the interior sidewall of the centrally located downwardly extending generally tubular cylindrical portion of the valve body; and (h) a preload compression spring, the preload compression spring affixed to the distal end of the downwardly extending shaft and located to exert compressive force between the downwardly extending shaft and the upper side of the plunger.

29. A self-inflating mattress, the self-inflating mattress comprising:

(a) an air impervious outer layer;

(b) a self-inflating foam portion, the self-inflating foam portion having an outer surface, the self-inflating foam portion located within the air impervious layer, and wherein the outer surface is bonded to an interior wall of the air impervious layer; and (c) a compact check valve, the compact check valve for controlling fluid flow into, or out of, or both into and out of the self-inflating mattress via a port through the air-impervious outer layer, wherein the self-inflating mattress is configured for operation in ambient atmospheric conditions, the compact check valve further comprising (1) a preload selector knob, the preload selector having a top and a bottom, the top generally circular in shape and having a perimeter with knurls along the perimeter, the preload selector further comprising a downwardly extending shaft, the downwardly extending shaft having a distal end, the downwardly extending shaft having a threaded portion at least along an upper portion thereof, the downwardly extending shaft further including around a lower portion thereof, an anti-backout seal;

(2) a valve body, the valve body having a top and a centrally located downwardly extending generally tubular cylindrical portion having an interior sidewall, and extending at least along a portion of the interior sidewall, vertically extending slots;

(3) a knob gasket, the knob gasket operably configured to seal a gap between the bottom of the preload selector knob and the top of the valve body;

(4) a preload guide;

(5) a plunger, the plunger having an underside and an upper side;

(6) an umbrella valve, the umbrella valve comprising a stem;

(7) a plunger gasket, the plunger gasket operable to seal, or to unseal, a gap between the underside of the plunger and the interior sidewall of the centrally located downwardly extending generally tubular cylindrical portion of the valve body; and (8) a preload compression spring, the preload compression spring affixed to the distal end of the downwardly extending shaft and located to exert compressive force between the downwardly extending shaft and the upper side of the plunger.

* * * * *